United States Patent
Kroll et al.

(10) Patent No.: US 10,751,831 B2
(45) Date of Patent: Aug. 25, 2020

(54) FEED-THROUGH COMPONENT

(71) Applicant: Schott AG, Mainz (DE)

(72) Inventors: Frank Kroll, Landshut (DE); Helmut Hartl, Vienna (AT); Andreas Roters, Mainz (DE); Hauke Esemann, Woerrstadt (DE); Dieter Goedeke, Bad Soden (DE); Ulf Dahlmann, Gau-Odernheim (DE); Sabine Pichler-Wilhelm, Landshut (DE); Martin Landendinger, Rottenburg (DE); Linda Johanna Backnaes, Landshut (DE)

(73) Assignee: Schott AG, Mainz (DE)

( * ) Notice: Subject to any disclaimer, the term of this patent is extended or adjusted under 35 U.S.C. 154(b) by 859 days.

(21) Appl. No.: 13/968,541

(22) Filed: Aug. 16, 2013

(65) Prior Publication Data
US 2013/0330605 A1 Dec. 12, 2013

Related U.S. Application Data

(63) Continuation of application No. PCT/EP2012/000702, filed on Feb. 17, 2012.

(30) Foreign Application Priority Data

Feb. 18, 2011 (DE) .................. 10 2011 011 705
Feb. 25, 2011 (DE) .................. 10 2011 012 430
(Continued)

(51) Int. Cl.
*H01M 2/30* (2006.01)
*B23K 15/00* (2006.01)
(Continued)

(52) U.S. Cl.
CPC ............ *B23K 15/0093* (2013.01); *B23K 1/19* (2013.01); *B23K 26/32* (2013.01); *C03C 3/19* (2013.01);
(Continued)

(58) Field of Classification Search
CPC .... B23K 15/0093; B23K 26/32; C03C 27/02; C03C 29/00; C03C 3/19; C03C 4/20;
(Continued)

(56) References Cited

U.S. PATENT DOCUMENTS 961,672 A 6/1910 Barnhurst
3,005,865 A 10/1961 Jonsson
(Continued)

FOREIGN PATENT DOCUMENTS

DE 27 33 948 A1 8/1978
DE 690 23 071 T2 6/1996
(Continued)

OTHER PUBLICATIONS

"Handbook of Batteries", published by David Linden, 2nd issue, McGrawhill, 1995, Chapter 36 & 39 (88 pages).
(Continued)

*Primary Examiner* — Zhongqing Wei
(74) *Attorney, Agent, or Firm* — Taylor IP, P.C.

(57) ABSTRACT

A feed-through component for a conductor feed-through which passes through a part of a housing, for example a battery housing, is embedded in a glass or glass ceramic material and has at least one conductor, for example an essentially pin-shaped conductor, and a head part. The surface, in particular the cross-sectional surface, of the head part is greater than the surface, in particular the cross-sectional surface, of the conductor, for example of the essentially pin-shaped conductor. The head part is embodied such that is can be joined to an electrode-connecting com-
(Continued)

ponent, for example an electrode-connecting part, which may be made of copper, a copper alloy CuSiC, an aluminum alloy AlSiC or aluminum, with a mechanically stable and non-detachable connection.

47 Claims, 8 Drawing Sheets

(30) Foreign Application Priority Data

| | | |
|---|---|---|
| Apr. 1, 2011 | (DE) | 10 2011 015 869 |
| Jun. 10, 2011 | (DE) | 10 2011 103 975 |
| Jun. 10, 2011 | (DE) | 10 2011 103 976 |
| Jul. 7, 2011 | (DE) | 10 2011 106 873 |

(51) Int. Cl.

| | |
|---|---|
| *C03C 3/19* | (2006.01) |
| *C03C 4/20* | (2006.01) |
| *C03C 8/24* | (2006.01) |
| *C03C 29/00* | (2006.01) |
| *H01M 2/06* | (2006.01) |
| *H01M 10/0525* | (2010.01) |
| *C03C 8/00* | (2006.01) |
| *C03C 27/02* | (2006.01) |
| *H01M 2/24* | (2006.01) |
| *B23K 26/32* | (2014.01) |
| *B23K 1/19* | (2006.01) |
| *H01M 2/08* | (2006.01) |
| *H01M 10/0569* | (2010.01) |
| *B23K 101/36* | (2006.01) |
| *B23K 103/10* | (2006.01) |

(52) U.S. Cl.
CPC ............... *C03C 4/20* (2013.01); *C03C 8/00* (2013.01); *C03C 8/24* (2013.01); *C03C 27/02* (2013.01); *C03C 29/00* (2013.01); *H01M 2/06* (2013.01); *H01M 2/065* (2013.01); *H01M 2/08* (2013.01); *H01M 2/24* (2013.01); *H01M 2/305* (2013.01); *H01M 10/0525* (2013.01); *H01M 10/0569* (2013.01); *B23K 2101/36* (2018.08); *B23K 2103/10* (2018.08); *C03C 2204/00* (2013.01); *C03C 2207/08* (2013.01); *H01M 2220/20* (2013.01); *H01M 2300/0037* (2013.01); *Y02E 60/122* (2013.01); *Y10T 29/4911* (2015.01); *Y10T 29/49108* (2015.01); *Y10T 29/49115* (2015.01)

(58) Field of Classification Search
CPC ........ C03C 8/00; C03C 8/24; H01M 10/0525; H01M 2/06; H01M 2/065; H01M 2/24; H01M 2/305; Y02E 60/122; Y10T 29/49108; Y10T 29/4911; Y10T 29/49115
See application file for complete search history.

(56) References Cited

U.S. PATENT DOCUMENTS

| | | | |
|---|---|---|---|
| 4,212,930 A | 7/1980 | Athearn | |
| 5,015,530 A | 5/1991 | Brow et al. | |
| 5,104,755 A * | 4/1992 | Taylor | C03C 8/24 |
| | | | 174/50.61 |
| 5,262,364 A | 11/1993 | Brow et al. | |
| 5,773,959 A | 6/1998 | Merritt et al. | |
| 5,849,434 A | 12/1998 | Miura et al. | |
| 5,853,914 A | 12/1998 | Kawakami | |
| 5,874,185 A | 2/1999 | Wang et al. | |
| 5,900,183 A | 5/1999 | Kronfli et al. | |
| 5,952,126 A | 9/1999 | Lee et al. | |
| 5,994,975 A | 11/1999 | Allen et al. | |
| 6,159,630 A | 12/2000 | Wyser | |
| 6,475,669 B2 | 11/2002 | Probst et al. | |
| 6,767,666 B2 | 7/2004 | Nemoto et al. | |
| 7,294,430 B2 | 11/2007 | Wyser | |
| 7,335,443 B2 | 2/2008 | Magneron | |
| 7,687,200 B2 | 3/2010 | Jouanneau-Si-Larbi et al. | |
| 9,136,520 B2 | 9/2015 | Kim et al. | |
| 2003/0134194 A1* | 7/2003 | Lasater | C03C 8/24 |
| | | | 429/181 |
| 2004/0137322 A1* | 7/2004 | Hong | H01M 2/0202 |
| | | | 429/176 |
| 2008/0050945 A1* | 2/2008 | Ma | H01R 12/88 |
| | | | 439/70 |
| 2011/0294001 A1* | 12/2011 | Byun | H01M 2/06 |
| | | | 429/181 |

FOREIGN PATENT DOCUMENTS

| | | |
|---|---|---|
| DE | 101 05 877 A1 | 8/2001 |
| DE | 698 04 378 T2 | 10/2002 |
| DE | 699 23 805 T2 | 7/2005 |
| DE | 10 2009 011 182 A1 | 9/2010 |
| DE | 10 2011 012 430 A1 | 8/2012 |
| EP | 0 035 074 A2 | 9/1981 |
| EP | 0 412 655 A2 | 7/1990 |
| EP | 0 885 874 A1 | 5/1998 |
| EP | 0 954 045 A2 | 4/1999 |
| FR | 2 585 185 | 1/1987 |
| JP | 62-73555 A | 4/1987 |
| JP | 2-60051 A | 2/1990 |
| JP | 2000-164198 A | 6/2000 |
| JP | 2002-27638 A | 1/2002 |
| JP | 2003-45406 A | 2/2003 |
| JP | 2009-54966 A | 3/2009 |
| SU | 1 058 909 A1 | 12/1983 |
| WO | 2012/110244 A1 | 8/2012 |

OTHER PUBLICATIONS

R. Gorke, K.J. Leers: Keram.Z.48 (1996), "Automatisierung eines Erhitzungsmikroskops mit Hilfe digitaler Bildverarbeitung", pp. 300-305 (5 pages).
International Search Report dated Jun. 22, 2012 for International Application No. PCT/EP2012/000702 (6 pages).
DIN 51730, Testing of solid fuels—Determination of fusibility of fuel ash, Sep. 2007 (16 pages).
ISO 540, Hard coal and coke—Determination of ash fusibility, International Standard, Fourth edition, Jun. 1, 2008 (20 pages).
DIN CEN/TR 15404, Solid recovered fuels—Methods for the determination of ash melting behaviour by using characteristic temperatures, Nov. 2010 (19 pages).
DIN CEN/TS 15370-1, Solid biofuels—Method for the determination of ash melting behaviour—Part 1: Characteristic termperatures method, Dec. 2006 (12 pages).
Notification Concerning Transmittal of International Preliminary Report on Patentability and Written Decision of the International Searching Authority dated Aug. 29, 2013 for International Application No. PCT/EP2012/000702 (7 pages).
European Office Action dated Feb. 20, 2017 for European Patent Application No. 12 705 792.5 (6 pages).

\* cited by examiner

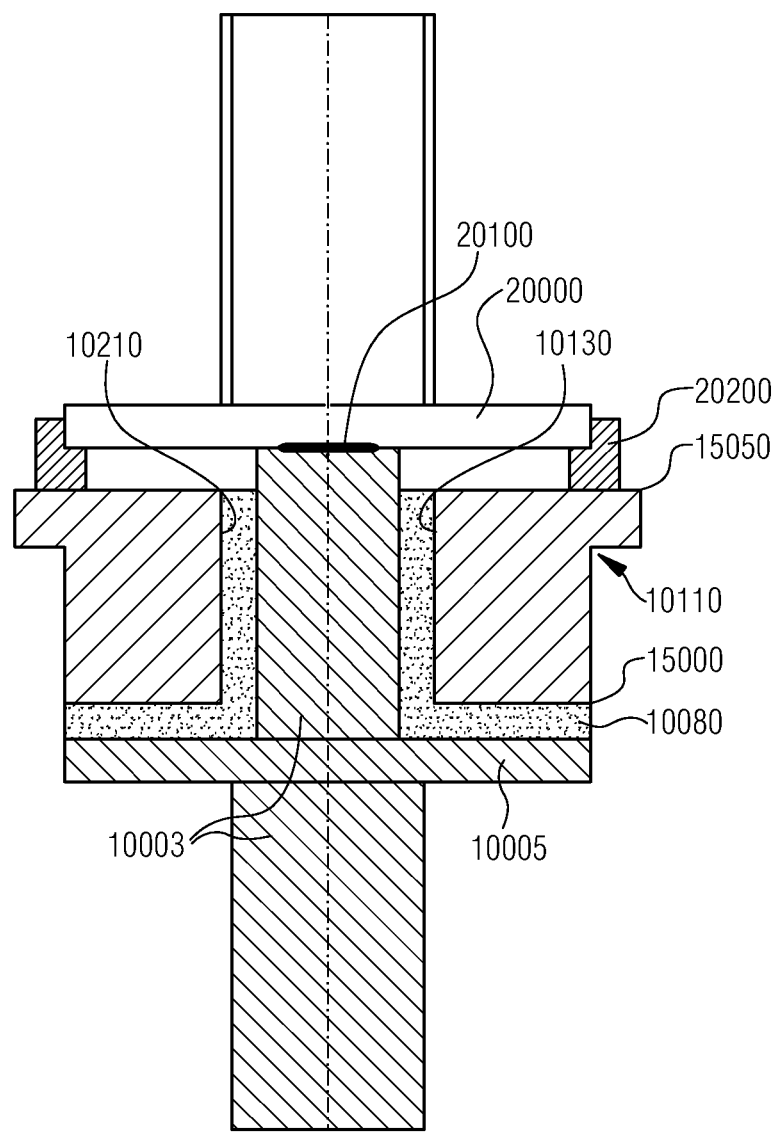

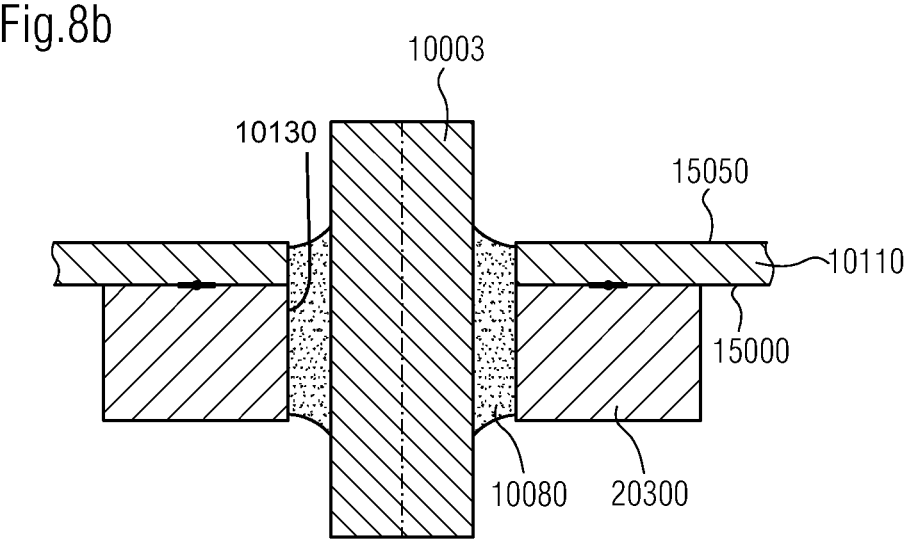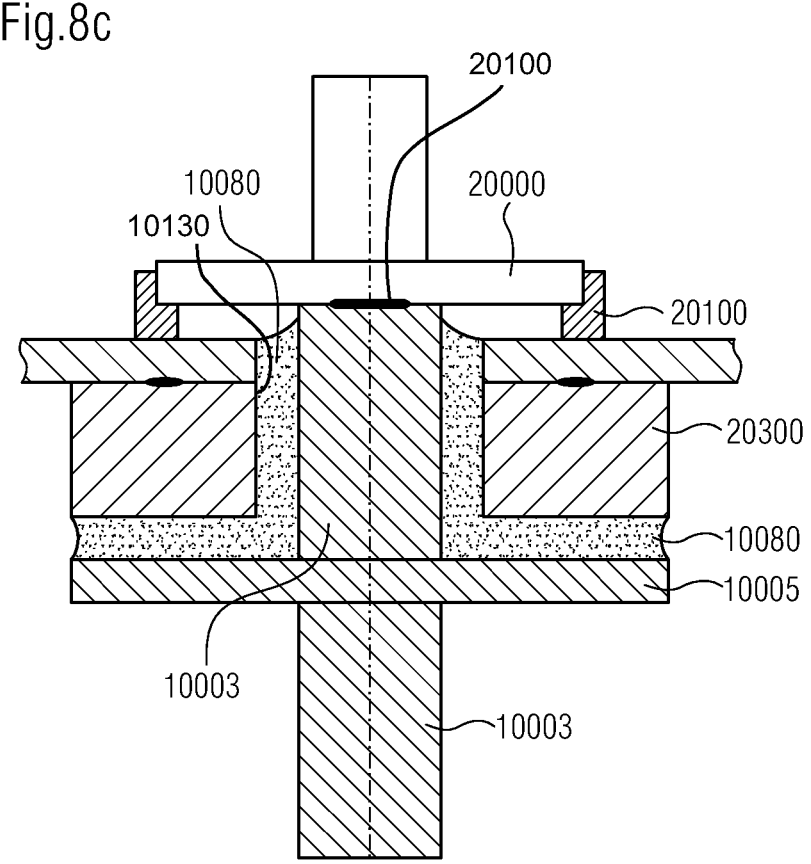

FEED-THROUGH COMPONENT

CROSS REFERENCE TO RELATED APPLICATIONS

This is a continuation of PCT application No. PCT/EP2012/000702, entitled "FEED-THROUGH COMPONENT", filed Feb. 17, 2012, which is incorporated herein by reference.

BACKGROUND OF THE INVENTION

1. Field of the Invention

The present invention relates to a feed-through component for a conductor feed-through which passes through a part of a housing, for example, a battery housing, which is embedded in a glass or glass ceramic material. The feed-through component includes an essentially pin-shaped conductor and a head part.

2. Description of the Related Art

Accumulators, preferably lithium-ion batteries are intended for various applications, for example for portable electronic equipment, cell phones, power tools and in particular electric vehicles. The batteries can replace traditional energy sources, for example lead-acid batteries, nickel-cadmium batteries or nickel-metal hydride batteries.

Lithium-ion batteries have been known for many years. In this regard we refer you to the "Handbook of Batteries, published by David Linden, 2nd issue, McGrawhill, 1995, chapters 36 and 39". Various aspects of lithium-ion accumulators are described in a multitude of patents, for example: U.S. Pat. Nos. 961,672; 5,952,126; 5,900,183; 5,874,185; 5,849,434; 5,853,914; and 5,773,959.

Lithium-ion batteries, in particular for applications in the automobile industry, generally feature a multitude of individual battery cells which are generally connected in-series. The in-series connected battery cells are usually combined into so-called battery packs and then to a battery module which is also referred to as a lithium-ion battery. Each individual battery cell has electrodes which are led out of a housing of the battery cell.

In particular in the use of lithium-ion batteries in the automobile industry, a multitude of problems such as corrosion resistance, stability in accidents and vibration resistance must be solved. An additional problem is the hermetic seal of the battery cells over an extended period of time. The hermetic seal may, for example, be compromised by leakage in the area of the electrodes of the battery cell, or respectively the electrode feed-through of the battery cell. Such leakages may, for example, be caused by temperature changes and alternating mechanical stresses, for example vibrations in the vehicle or aging of the synthetic material. A short-circuit or temperature changes in the battery or respectively battery cell can lead to a reduced life span of the battery or the battery cell.

In order to ensure better stability in accidents, a housing for a lithium-ion battery is suggested, for example in DE 101 05 877 A1, whereby the housing includes a metal jacket which is open on both sides and which is being sealed. The power connection or respectively the electrodes are insulated by a synthetic material. A disadvantage of the synthetic material insulation is the limited temperature resistance, the limited mechanical stability, aging and the uncertain hermetic seal over the service life. The feed-throughs on the lithium-ion batteries according to the current state of the art are therefore not integrated hermetically sealed into the cover part of the lithium-ion battery. Moreover, the electrodes are crimped and laser welded connecting components with additional insulators in the interior of the battery, or respectively battery cell.

An additional problem with the lithium-ion batteries according to the current state of the art is that the battery cells occupy a large space and because of the high currents due to resistance losses, heat and temperature changes occur quickly.

An alkaline battery has become known from DE 27 33 948 A1 wherein an insulator, for example glass or ceramic, is joined directly by means of a fusion bond with a metal component.

One of the metal parts is connected electrically with one anode of the alkaline battery and the other is connected electrically with one cathode of the alkaline battery. The metals used in DE 27 33 948 A1 are iron or steel. Light metals like aluminum are not described in DE 27 33 948 A1. Also, the sealing temperature of the glass or ceramic material is not cited in DE 27 33 948 A1. The alkaline battery described in DE 27 33 948 A1 is a battery with an alkaline electrolyte which, according to DE 27 33 948 A1, contains sodium hydroxide or potassium hydroxide. Lithium-ion batteries are not mentioned in DE 27 33 948 A1.

A method to produce asymmetrical organic carboxylic acid esters and to produce anhydrous organic electrolytes for alkali-ion batteries has become known from DE 698 04 378 T2, or respectively EP 0885 874 B1. Electrolytes for rechargeable lithium-ion cells are also described in DE 698 04 378 T2, or respectively EP 0 885 874 B1.

An RF-feed through, or radio frequency feed-through, with improved electrical efficiency is described in DE 699 23 805 T2, or respectively EP 0 954 045 B1. The feed-throughs known from DE 699 23 805 T2, or respectively EP 0 954 045 B1, are not glass-metal feed-throughs. Glass-metal feed-throughs which are provided immediately inside, for example the metal wall of a packing, are described in EP 0 954 045 B1 as being disadvantageous since RF-feed throughs of this type, due to embrittlement of the glass, are not durable.

DE 690 230 71 T2, or respectively EP 0 412 655 B1, describes a glass-metal feed-through for batteries or other electro-chemical cells, whereby glasses having a $SiO_2$ content of approximately 45 weight % are being used and metals, in particular alloys are being used which contain molybdenum and/or chromium and/or nickel. The use of light metals is also insufficiently addressed in DE 690 230 71 T2, as are sealing temperatures or bonding temperatures for the used glasses. The materials used for the pin shaped conductor are, according to DE 690 230 71 T2 or respectively EP 0 412 655 B1, alloys which contain molybdenum, niobium or tantalum.

A glass-metal feed-through for lithium-ion batteries has become known from U.S. Pat. No. 7,687,200. According to U.S. Pat. No. 7,687,200, the housing was produced from high-grade steel and the pin-shaped conductor from platinum/iridium. The glass materials cited in U.S. Pat. No. 7,687,200 are glasses TA23 and CABAL-12. According to U.S. Pat. No. 5,015,530 these are $CaO$—$MgO$—$Al_2O_3$—$B_2O_3$ systems having sealing temperatures of 1025° C. or 800° C. Moreover, glass compositions for glass-metal feed-throughs for lithium batteries have become known from U.S. Pat. No. 5,015,530, which contain $CaO$, $Al_2O_3$, $B_2O_3$, $SrO$ and $BaO$ whose sealing temperatures are in the range of 650° C.-750° C. and which are therefore too high for use with light metals. Furthermore, barium is undesirable in many applications since it is considered to be environmentally harmful and hazardous to health. Also discussed is strontium, the use of which is also to be avoided in the future.

The glass compositions according to U.S. Pat. No. 7,687,200 moreover have a coefficient of expansion α in the temperature range of 20° C. to 350° C. of only α≈9×10⁻⁶ per degree Kelvin.

What is needed in the art is a feed-through which avoids the problems of the current state of the art.

SUMMARY OF THE INVENTION

The present invention provides a feed-through component for a feed-through of a conductor through a part of a housing, for example a battery housing, embedded in a glass or a glass ceramic material with an essentially pin-shaped conductor and a head part. The dimensions of the head part are larger than those of the essentially pin shaped conductor. On a conductor which has a substantially round cross section, the dimensions of the head part are then greater than the diameter of the pin-shaped conductor. This means that the head surface of the head part is greater than the head surface of the pin-shaped conductor with which the head part is connected. The head part can moreover be configured such that it can be connected with an electrode connecting component. The electrode connecting component is, for example, a component formed from copper for the cathode or aluminum for the anode. Joining of the head part and the electrode connecting component occurs through a mechanically stable, for example non-detachable electrical connection. A mechanically stable, non-detachable electrical connection of this type is provided in that the head part and the electrode connecting part are firmly connected by welding, for example laser welding, resistance welding, electron beam welding, friction welding, ultrasonic welding, or by bonding, gluing, soldering, caulking, shrinking, grouting, clamping and crimping. The connection of the head part and the electrode connecting part to the feed-through component occurs, for example, after the feed-through component including the head part and the pin-shaped conductor are inserted or sealed into the housing of the battery or battery cell. It would of course also be possible, to connect the feed-through component with the electrode connecting component prior to insertion or respectively sealing.

A battery according to the present invention is to be understood to be a disposable battery which is disposed of and/or recycled after its discharge, as well as an accumulator.

The present invention provides a feed-through component which, when used in a housing for battery cells, requires only a small interior space. The head part of the inventive feed-through component has a very large supporting surface for the connection of the electrode connecting component. Very high stability is herewith achieved in the connection area. In particular, compared to a connection of the electrode connecting components directly to the pins, a substantially greater flexural rigidity is achieved. Another advantage of a connection of the electrode connecting components via the head part is in that, as opposed to a direct connection with the pin, constrictions, or respectively considerable changes in the cross sectional area in the conducting path from the battery cell to the feed-through through the housing of the battery cell are avoided. Cross sectional constrictions—especially at high currents of 20 amperes (A) to 500 A—lead to great heat dissipation in lithium-ion accumulators as the energy supplier in automobiles, which can cause problems in the battery cells. Such heat dissipation can be avoided with the head part of the feed-through component of the present invention. Moreover it is possible to produce the feed-through component separately from the electrode connecting component, thereby facilitating an optimized separate fabrication of the electrode connecting component and the feed-through component. The separately produced electrode feed-through component and the separately produced electrode connecting component are connected with each other only after the respective individual fabrication, for example after the feed-through component was placed or sealed into the opening in the housing part. Additional advantages of the separate fabrication of the electrode connecting components as well as the feed-through components and their subsequent connection to each other are also found in that the material selection can be made specifically for the different components, in particular in regard to the respective fabrication technology.

With the technology of the present invention, additional insulators in the interior of the battery as are customary with currently used electrode connecting components are avoided.

According to an embodiment of the present invention, the head part is configured as a centering component, for example in the embodiment of an extension protruding over the head part of the essentially pin-shaped conductor. The extension, or respectively protrusion, serves essentially to center an electrode connecting part and/or to prevent twisting of the electrode connecting part which is being connected with the head part. The feed-through component with head part is moreover arranged so that the conductor cross section remains essentially the same over the entire current path from the feed-through to the electrode connections of the electrode connecting component. This ensures that no heat dissipation occurs over the entire current path as would be the case with conductor constrictions. The electrode connecting component which is joined with the feed-through component may be a flat component, whose thickness is small in comparison to the dimensions of the component essentially vertical to the thickness. The thickness of the component is, for example, between approximately 0.5 millimeter (mm) and 5 mm. The dimensions of the component vertical to the thickness, for example on a flat, essentially circular component, are then in a range of between approximately 5 mm and 30 mm.

To be able to also use electrode connecting parts which do not consist of a single material, for example copper for the cathode and aluminum for the anode, provision may be made for providing electrode connecting components of other materials and to subsequently subject them to surface treatment. The surface of the electrode connecting component can, for example, be coated in a surface treatment. An electrode-component can, for example, be coated with Copper (Cu), Aluminum (Al), Nickel (Ni), Gold (Au), Palladium (Pd), Zinc (Zn), and Silver (Ag). Other materials are also possible, in particular also alloys, for example aluminum alloys, copper alloys, silver alloys or gold alloys.

A secure connection of the electrode-component with the feed-through component is achieved through welding, soldering, grouting, caulking, flanging, shrinking, clamping or crimping. The connection may be produced with the assistance of welding, for example laser welding, resistance welding, ultrasonic welding, friction welding or electron beam welding.

Materials used for the pin-shaped conductor are, for example, copper, a copper alloy, aluminum or an aluminum alloy. However, other materials such as nickel-iron (NiFe) with a copper core, that is a NiFe-jacket with a copper interior or core, as well as a cobalt-iron alloy, aluminum alloys, magnesium or magnesium alloys, as well as silver, a silver alloy, gold or a gold alloy, can also be used for the pin-shaped conductor.

In order to avoid bending of the electrode connecting component during installation into the housing and to thereby prevent a short circuit, provision may be made to provide the electrode-component with a reinforcement profile.

In an embodiment of the present invention, the dimension that is the surface of the head part, is selected so that it covers at least one feed-through opening, for example that of a battery housing, with glass or glass ceramic material in place. As an option, a head part protruding over the glass or glass ceramic material can also be provided in order to provide more connection options for the electrode connecting components. The connection of the electrode connecting components with the head part occurs through welding, for example laser welding, resistance welding, electron beam welding, ultrasonic welding, friction welding, or bonding, gluing, soldering, caulking, shrinking, grouting, clamping and crimping.

In addition to the inventive feed-through component a method to produce such a feed-through component is also cited according to the present invention, wherein first the feed-through component including the essentially pin-shaped conductor and the head part are provided. In an independent manufacturing process thereof an electrode connecting component is provided and after the separate production of the feed-through component and the electrode connecting component, the electrode connecting component is joined with the feed-through component to be mechanically stable, non-detachable and have good mechanical conductivity, in particular in the region of the head component. A connection can be provided through welding, for example laser welding, resistance welding, electron beam welding or soldering, but also through caulking, shrinking, grouting, clamping and crimping.

Good electric conductivity is, for example, if the conductivity of the complete component including the pin-shaped conductor with the head component and the electrode connecting component joined with the conductor is greater than $10 \times 10^6$ Siemens per meter (S/m), for example greater than $15 \times 10^6$ S/m, or greater than $25 \times 10^6$ S/m or further, in the range of $10 \times 10^6$ S/m and $50 \times 10^6$ S/m.

In order to produce an optimum connection between the feed-through component and the electrode connecting component, specific surface treatments necessary for this type of connection can be performed, for example coating with a metal. For example, a coating with Cu or Al can be applied, if the material of the electrode connecting component is not copper or aluminum. The material of the conductor or respectively the pin material of the feed-through component, or respectively the material of the entire feed-through component, can also be copper, aluminum but also a copper core, that is a NiFe-jacket with a copper interior or CF25, in other words a cobalt-iron alloy, silver, a silver alloy, gold or a gold alloy.

It is also feasible for the material of the feed-through component, as well as of the electrode connecting component to include the same material, for example copper or aluminum. Copper is hereby used for the cathode, and aluminum for the anode.

As aluminum, or respectively an aluminum alloy, for the conductor the following may be used:
EN AW-1050 A;
EN AW-1350;
EN AW-2014;
EN AW-3003;
EN AW-4032;
EN AW-5019;
EN AW-5056;
EN AW-5083;
EN AW-5556A;
EN AW-6060; and
EN AW-6061.

As copper, in particular for the conductor, the following may be used:
Cu-PHC 2.0070;
Cu-OF 2.0070;
Cu-ETP 2.0065;
Cu-HCP 2.0070; and
Cu-DHP 2.0090.

A reducible connection of the electrode connecting component with the feed-through component may be achieved, for example, in that the electrode connecting component is provided with a centering option, for example a centering opening or a twist lock and the head part of the feed-through component with an extension or protrusion which, for example engages in a centering opening of the electrode connecting component.

An additional arrangement of the present invention can provide that sealing of the feed-through component in a glass or glass ceramic material into a base body occurs whereby the base body is subsequently inserted into an opening of the housing component and, after the insertion of the feed-through component, is connected with the electrode connecting component. The base body is, for example, ring-shaped in configuration with a circular or oval opening, depending on the shape of the pin accommodated by the base body. The base body includes, for example, a light material, such as aluminum, an aluminum alloy, magnesium or magnesium alloy, titanium or titanium alloy. The base body may however also include high-grade steel, steel, stainless steel or tool steel.

The feed-through component can alternatively be sealed directly into an opening of the housing component, for example a housing component of a battery housing, and subsequently connected with the electrode connecting component. The arrangement of sealing in a base body instead of a direct sealing into the housing part, for example the cover part, has several advantages. In the arrangement of the feed-through through the housing part by an additional base body into which the pin-shaped conductor material is sealed, it is possible to pre-manufacture the feed-through, in other words to seal the pin material into the base body and subsequently install it into the housing component, in particular into a battery cell. The base body can then be optimized for the respective manufacturing technology and shape of the feed-through and the manufacturing technology and shape of the housing. Substantially smaller heating devices can be used due to pre-manufacturing than when sealing directly into the housing component, since the entire housing component does not need to be heated, for example in an oven, but instead only the base body with its substantially smaller dimensions. A configuration of this type where pre-manufacturing of the feed-through including a base body and a conductor, for example an essentially pin-shaped conductor is possible, moreover makes possible a cost effective integration of the feed-through into the opening of the housing component, for example in a single step process, for example by utilizing strain-hardening options of the housing component. Effectively this means that the opening is first worked into the housing component, for example into the cover of the opening, for example by stamping. The housing is strain-hardened since it is not heated. In contrast hereto, the base body is soft, since during sealing of the pin-shaped conductor with a glass or glass ceramic material it is heated. In this way it is possible to produce a structurally stable battery cell housing, in particular in the area of the feed-through, since in contrast to—for example—direct sealing into a housing component, no loss of the strain-hardening in the housing component, in particular the cover, occurs. An additional advantage is that the material strength of the housing component compared to the base body into which the sealing of the pin-shaped conductor occurs can be selected to be clearly less. For example, the material strength of the housing component can be approximately 1.5 millimeters (mm) or less, whereas the base body, due to reasons of strength, has a thickness of 2.0 mm or more, for example 3.0 mm or more. The material thickness of the housing or respectively housing component is, for example between 1 mm and 3 mm or between 1.5 mm and 3 mm. The thickness of the base body is between 2 mm and 6 mm, for example 2.5 mm and 5 mm. The thickness of the base body is hereby always adapted to the material thickness of the housing or the housing component, in particular the battery cover, into which the feed-through is placed. In the case of direct sealing, unnecessarily great material thicknesses would in contrast be required. The material of the housing component is, for example, a metal, such as high-grade steel, normal steel or tool steel, or may be a light metal, for example aluminum, AlSiC, an aluminum alloy, magnesium or a magnesium alloy. Titanium and/or titanium alloys such as Ti6246 and/or Ti6242 may be used for the battery housing as well as for the base body. Titanium is a material which is well tolerated by the body, so that it is used for medical applications, for example in prosthetics. Due to its strength, resistance and low weight its use is also favored in special applications, for example in aerospace applications.

Standard steels used for the base body and/or the housing can in particular be St35, St37 or St38. Exemplary high-grade steels are X12CrMoS17, X5CrNi1810, XCrNiS189, X2CrNi1911, X12CrNi177, X5CrNiMo17-12-2, X6CrNiMoTi17-12-2, X6CrNiTi1810 and X15CrNiSi25-20, X10CrNi1808, X2CrNiMo17-12-2, X6CrNiMoTi17-12-2, in particular however high-grade steels having material grade numbers (WNr.) according to Euro-Norm (EN) 1.4301, 1.4302, 1.4303, 1.4304, 1.4305, 1.4306 as well as 1.4307. These high-grade steels distinguish themselves through their effective weldability as well as deep-drawing properties.

Machining steels, for example with material number 1.0718, which possess a suitable coefficient of expansion and can be machined by turning, or construction steels, or those having material number 1.0338, which can be processed by punching and can be used for the housing and/or the base body.

In addition to the feed-through component and the method to produce a feed-through component, the present invention also provides a housing, in particular for a lithium-ion battery or respectively a battery cell of a lithium-ion cell, which has a feed-through component with at least one essentially pin-shaped conductor with a head part. The feed-through component is sealed into at least one opening of the housing, for example the battery housing or respectively the battery cell housing, embedded in a glass or glass ceramic material. A requirement for suitable glasses is generally that they provide sufficient insulation, sufficient mechanical strength for tension and pressure, a high torsional and flexural moment, high temperature and chemical resistance.

In addition to the feed-through, the present invention also provides an electric storage device, such as a battery, for example a battery cell, in particular with a battery cell housing which includes a feed-through according to the present invention. The battery cell housing includes, for example, the same material as the base body, for example a light metal. The battery is, for example a lithium-ion battery. The lithium-ion battery uses, for example, a non-aqueous electrolyte, in particular on a carbonate basis, such as a carbonate mixture. The carbonate mixture can include an ethylene-carbonate mixed with dimethyl-carbonate with a conducting salt, for example $LiPF_6$.

Alternatively to sealing directly into an opening of a component of the battery housing or respectively battery cell housing, it would also be conceivable to first seal the feed-through component into a base body and then to insert this base body into an opening of the housing component. The base body is, for example, a ring-shaped base body, for example essentially consisting of aluminum. Sealing of the feed-through component, in particular in the area of the pin-shaped conductor, with a base body offers the advantage that sealing of the pin-shaped conductor with the base body can be performed first, and that the feed-through component with the base body is subsequently and cost-effectively placed in the opening of the housing part—for example in a one-step process, for example by utilizing the strain-hardening options of the housing component. Effectively this means that the opening is first worked into the housing component, for example into the cover, for example by stamping. The housing is strain-hardened since it is not heated. In contrast hereto, the base body is soft, since during sealing of the pin-shaped conductor with a glass or glass ceramic material it is heated. In this way it is possible to produce a structurally stable battery cell housing, in particular in the area of the feed-throughs. An additional advantage is that the materials for the base body and housing part or respectively housing component can be selected to be different from each other, in particular in regard to the material quality and selection of an alloy. The feed-through can be connected with the base body in the housing component hermetically sealed by welding, pressing, crimping, and shrinking. When joining the feed-through with the housing component, for example by welding, care is taken to keep the temperature input as low as possible in order to avoid damage to the glass or glass ceramic material. In this application "hermetically sealed" means that the helium-leakage is less than $1 \times 10{-8}$ bar·liter per second (bar l/sec). In contrast to the current state of the art wherein a plastic seal had to be provided for the feed-through in a multistep process, a hermetically sealed integration of the inventive feed-through component with the housing component can be produced in a single, simple process step.

Moreover, the selection of the base body can occur also in consideration of the material of the housing component, both as far as the edge configuration as well as the material hardness, are concerned and also the method of closure of the housing. If the housing of the battery cell consists for example of aluminum, then the material for the base body may be selected to be also aluminum.

Moreover it is possible to also introduce other functions in the housing component, in addition to the feed-throughs, for example a safety valve and/or battery filling opening.

In an embodiment of the present invention the conductor, for example the essentially pin-shaped conductor, includes as a material a metal, for example a light metal, such as aluminum, AlSiC, aluminum alloys, magnesium, magnesium alloys, copper, copper alloys, silver, gold, a silver alloy or a gold alloy. For the pin-shaped conductor copper (Cu) or a copper alloy is used, for example if the pin-shaped conductor is connected to a cathode of the electro-chemical cell or respectively battery cell, and aluminum (Al) or an aluminum alloy if the pin-shaped conductor is connected to an anode. Other materials for the pin-shaped conductor can include CuSiC, AlSiC, NiFe, that is a NiFe jacket with an interior copper part, an aluminum alloy, a magnesium alloy, magnesium, silver, a silver alloy, gold, a gold alloy, as well as a cobalt-iron alloy.

Materials for the base body may also include metals such as steel, stainless steel, high-grade steels, light metals, for example titanium, titanium alloys, aluminum, aluminum alloys, magnesium or magnesium alloys, without restriction thereto.

In the current application, metals which have a specific weight of less than 5.0 kilograms per cubic decimeter ($kg/dm^3$) are understood to be light metals. The specific weight of the light metals is, for example, in the range of 1.0 $kg/dm^3$ to 3.0 $kg/dm^3$.

If the light metals are additionally used as materials for the conductors, for example for the pin-shaped conductor or the electrode connection component, then the light metals further distinguish themselves through an electric conductivity in the range of $5 \times 10^6$ S/m to $50 \times 10^6$ S/m. When used in compression glass feed-throughs the coefficient of expansion a of the light metal for the range of 20° C. to 300° C. is moreover in the range of $18 \times 10^{-6}$/K to $30 \times 10^{-6}$/K. Light metals generally have melting temperatures in the range of 350° C. to 800° C.

In the current invention "feed-through component" is to be understood to be a component which is part of an electric feed-through of a conductor through a housing. The feed-through component can include the conductor and a head part. In a special arrangement, the feed-through includes, in addition, a base body into which at least the pin-shaped conductor of the feed-through component is sealed, embedded in a glass or glass ceramic material. The base body with the sealed feed-through component can be inserted into an opening in a housing part of the battery cell as one unit, thereby representing the feed-through. Alternatively, the feed-through component can also be sealed, embedded in a glass or glass ceramic material, directly into the opening of the housing compartment. The feed-through component and the surrounding glass or glass ceramic material then represent the feed-through.

The base body is, for example, in the embodiment of a ring-shaped base body, such as in a circular shape, or an oval. The oval shape is, for example, feasible when the housing component, in particular the battery cover into whose opening(s) the feed-through component itself and/or the feed-through including the feed-through component and base body is integrated, has a narrow longitudinal shape and the glass or respectively glass ceramic material with which the pin-shaped conductor is guided through the housing component in the opening is integrated fully between the base body and the pin-shaped conductor or the housing part or respectively the housing component and the base body and the pin-shaped conductor. An arrangement with the base body permits pre-manufacturing of the feed-through including a feed-through component with an essentially pin-shaped conductor and an essentially ring-shaped base body.

Exemplary glass or glass ceramic materials for sealing the essentially pin-shaped conductor are such materials which have a sealing temperature which is lower than the melting temperature of the housing component or the base body and/or the essentially pin-shaped conductor. Exemplary glass or glass ceramic compositions may have low sealing temperatures, may have a composition including the following components in mole percent (mol-%):

| | |
|---|---|
| $P_2O_5$ | 35-50 mol-%, for example 39-48 mol-%; |
| $Al_2O_3$ | 0-14 mol-%, for example 2-12 mol-%; |
| $B_2O_3$ | 2-10 mol-%, for example 4-8 mol-%; |
| $Na_2O$ | 0-30 mol-%, for example 0-20 mol-%; |
| $M_2O$ | 0-20 mol-%, for example 12-19 mol-%, whereby M is, for example, K, Cs or Rb; |
| PbO | 0-10 mol-%, for example 0-9 mol-%; |
| $Li_2O$ | 0-45 mol-%, for example 0-40 mol-%, or 17-40 mol-%; |
| BaO | 0-20 mol-%, for example 0-20 mol-%, or 5-20 mol-%; and |
| $Bi_2O_3$ | 0-10 mol-%, for example 1-5 mol-%, or 2-5 mol-%. |

A further exemplary composition of the present invention includes the following components in mol-%:

| | |
|---|---|
| $P_2O_5$ | 38-50 mol-%, for example 39-48 mol-%; |
| $Al_2O_3$ | 3-14 mol-%, for example 4-12 mol-%; |
| $B_2O_3$ | 4-10 mol-%, for example 4-8 mol-%; |
| $Na_2O$ | 10-30 mol-%, for example 14-20 mol-%; |
| $K_2O$ | 10-20 mol-%, for example 12-19 mol-%; and |
| PbO | 0-10 mol-%, for example 0-9 mol-%. |

The previously listed glass compositions distinguish themselves not only through a low sealing temperature and a low transition temperature (Tg), but also in that they have sufficient resistance to battery-electrolytes and in this respect ensure the required long-term durability. The previously listed glass materials are stable phosphate glasses which, as known alkali-phosphate glasses have clearly a low overall alkali content. Because of the generally high crystallization-stability of the phosphate glasses it is ensured that the sealing of the glasses is generally not hampered even at temperatures of <600° C. This allows for most of the listed glass compositions to be used as solder glass since sealing of the glass compositions is generally not hampered even at temperatures of <600° C.

The previously mentioned glass compositions contain lithium (Li) which is integrated in the glass structure. The glass compositions are hereby especially suited for lithium-ion storage devices which include electrolytes based on lithium, for example a 1 Molar (M) $LiPF_6$-solution, including a 1:1 mixture of ethylene-carbonate and dimethyl-carbonate.

Low sodium or respectively sodium-free glass compositions are also feasible, since the diffusion of the alkali-ions occurs in Na+>K+>Cs+ sequence and since therefore low sodium glasses or respectively sodium-free glasses are especially resistant to electrolytes, especially those which are used in lithium-ion storage devices.

The resistance of the composition according to the present invention against the battery electrolytes can be verified in that the glass composition in the form of a glass powder is ground to a granularity of d50=10 micrometers (μm) and is stored in the electrolytes for a predetermined time period, for example one week. d50 means that 50% of all particles or granules of the glass powder are smaller than or equivalent to a diameter of 10 μm. As a non-aqueous electrolyte, a carbonate mixture of ethylene-carbonate and dimethyl-carbonate is used, for example at a ratio of 1:1 M $LiPF_6$ as conducting salt. After the glass powder was exposed to the electrolyte, the glass powder can be filtered off and the electrolyte examined for glass elements which were leached from the glass. Herein it has been proven that with phosphate glasses in the previously described composition ranges such leaching occurs surprisingly only to a limited extent of less than 20 mass percent (ma-%), and that in special instances leaching of <5 mass percent is achieved. Moreover, such glass compositions have a thermal expansion a 20° C. to 300° C.>14×10$^{-6}$/K, for example between 15× 10$^{-6}$/K and 25×10$^{-6}$/K. An additional advantage of the previously cited glass composition can be seen in that sealing of the glass with the surrounding light metal or respectively the metal of the conductor is possible also in a gaseous atmosphere which is not an inert gas atmosphere. In contrast to the previously used method, a vacuum is also no longer necessary for aluminum-sealing. This type of sealing can rather occur under atmospheric conditions. For both types of sealing nitrogen (N$_2$) or argon (Ar) can be used as inert gas. As a pre-treatment for sealing the metal, in particular the light metal, is cleaned and/or etched, and if necessary is subjected to targeted oxidizing or coating. During the process temperatures of between 300 and 600° C. are used at heating rates of 0.1 to 30 degrees Kelvin per minute (K/min) and dwell times of 1 to 60 minutes.

The sealing temperature may, for example, be determined through the hemispherical temperature as described in R. Görke, K. J. Leers: Keram. Z. 48 (1996) 300-305, or according to DIN 51730, ISO 540 or CEN/TS 15404 and 15370-1 whose disclosure content is incorporated in its entirety into the current patent application. The measurement of the hemispherical temperature is described in detail in DE 10 2009 011 182 A1, whose disclosure content is incorporated in its entirety into the current patent application. According to DE 10 2009 011 182A1 the hemispherical temperature can be determined in a microscopic process by using a heating stage microscope. It identifies the temperature at which an originally cylindrical test body melts into a hemispherical mass. A viscosity of approximately log η=4.6 deciPascals (dPas) can be allocated to the hemispherical temperature, as can be learned from appropriate technical literature. If a crystallization-free glass, for example in the form of a glass powder, is melted and then cooled so that it solidifies, it can then normally be melted down again at the same melting temperature. For a bonded connection with a crystallization-free glass this means that the operating temperature to which the bonded connection is continuously subjected may not be higher than the sealing temperature. Glass compositions as utilized in the current application are generally often produced from a glass powder which is melted down and which, under the influence of heat provides the bonded connection with the components which are to be joined. Generally, the sealing temperature or melting temperature is consistent with the level of the so-called hemispherical temperature of the glass. Glasses having low sealing temperatures, or respectively melting temperatures, are also referred to as solder glass. Instead of sealing or melting temperature, one speaks of solder temperature or soldering temperature in this instance. The sealing temperature or respectively the solder temperature may deviate from the hemispherical temperature by +20K.

The housing part, or respectively the housing component, of the battery cell or respectively the battery cell housing has an outside and an inside, and the feed-through component or feed-through with feed-through component and base body is, for example connected with the inside or the outside of the housing part, for example by flanging, welding, pressing, soldering or shrinking.

In an alternative embodiment of a feed-through according to the present invention, a conductor, such as a pin-shaped conductor having a head part is sealed into an opening of a housing, in particular of a battery cell housing in such a manner that the head part is connected with the outside of the battery housing. The arrangement of the head part on the outside acts as reinforcement and increases the stability, in particular on thin-walled battery housings. In an additional process step after sealing, an attachment is connected on the inside of the battery housing with the essentially pin-shaped conductor. Between the attachment and the inside of the battery housing a support disk can be provided for stabilization. The attachment can be welded or soldered together with the essentially pin-shaped conductor protruding into the inside. The attachment serves as the connection with the electrodes of the battery cell, however it can also serve as a contact between the battery cells.

An additional option to reinforce the battery housing is to provide an outer ring which will be connected with the outside of the battery housing, for example through welding. After installation of the outer ring to the outside of the battery housing or respectively the battery cover, the essentially pin-shaped conductor is sealed. This procedure offers the advantage that during sealing of the essentially pin shaped conductor into the battery housing or respectively the cover, leakages are avoided. Alternatively it would be possible to provide the battery housing as a single component unit whereby the strength of the battery housing in the region in which the sealing occurs is increased in that the material of the battery housing is transformed, for example through stamping.

The battery cell which is provided for the battery housing is, for example, a lithium-ion battery. The housing component of the battery cell is formed from, for example, a light metal having a low melting point, such as aluminum, an aluminum alloy, magnesium, a magnesium alloy, titanium, a titanium alloy or steel, high-grade steel, in particular stainless steel, or AlSiC.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIGS. 8a-8d illustrate a feed-through component with/without an electrode connecting component and with/without an outer ring.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
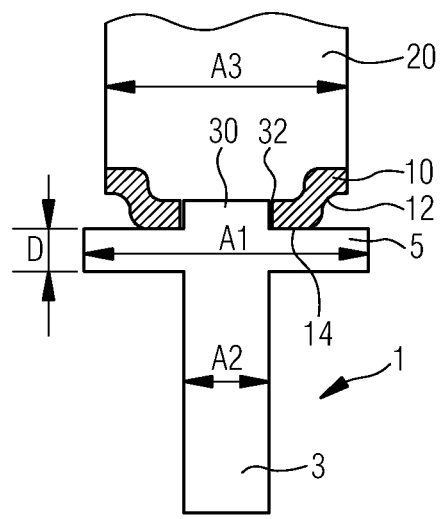
FIG. 1 is a first arrangement of a feed-through component with an electrode connecting component connected to the feed-through component according to an embodiment of the present invention.

Referring now to the drawings, and more particularly to FIG. 1, there is shown a first embodiment of a feed-through component 1 with an electrode connecting component 10 which is connected with feed-through component 1. Electrode connecting component 10 is connected with electrode 20, which forms the cathode or anode of the electrochemical cell or respectively battery cell. The feed-through component includes an essentially pin-shaped conductor 3 as well as a head part 5. Head part 5 of the feed-through component has a thickness D as well as a dimension A1 essentially vertical to thickness D. As can be seen in FIG. 1, dimension A1 vertical to thickness D of component 5 is substantially greater, in other words, head component 5 or respectively head part 5 is a substantially flat component. Dimensions A2 of the essentially pin-shaped conductor 3 which is connected with the head part 5 are smaller than dimension A1 of the head part. Dimension A2 is, for example, the diameter of the essentially round pin-shaped conductor 3. Because of dimension A1 which is greater than dimension A2 of the essentially pin-shaped conductor 3, head part 5 of pin-shaped conductor 3 protrudes beyond a surface of pin shaped conductor 3. If head part 5 is also essentially round, then the surface of head part 5 is always greater than the surface of pin-shaped conductor 3. Head part 5 is configured so that it can be joined with electrode connecting component 10, forming a mechanically stable, non-detachable connection. In the arrangement illustrated in FIG. 1, electrode connecting part 10 is provided with reinforcement stamping 12. However, region 14 of the electrode connecting part fits against the head part. In region 14, the electrode connecting component is connected mechanically stable, non-detachable and with good conductivity with head part 5 of feed-through component 1. In the embodiment illustrated in FIG. 1, the mechanically stable and non-detachable connection with electric conductivity of electrode connecting part 10 with head part 5 of feed-through component 1 is made through laser welding, flanging or caulking. In order to connect electrode connecting part 10 with head part 5 of feed-through component 1, feed-through component 1 includes in addition to head part 5 and essentially pin-shaped conductor 3 in the form of an extension 30 protruding beyond head part 5, and which for example engages in a centering opening 32 of electrode connecting component 10, so that the possibility of centering is provided for the electrode connecting part, based on centering opening 32 and extension 30. For this purpose extension 30 can be round, as well as not round. In addition to providing a centering possibility the arrangement of the extension also provides for a twist lock. This would be the case if the extension and the centering opening are not round, but for instance oval.

As can be seen in FIG. 1, electrode connecting component 10 has a dimension A3, which is substantially consistent with the width of electrode 20. This way guarantees that for the entire current path from the battery cell to the electrode connections, an essentially uniform cable cross section is ensured, so that no heat dissipation occurs in the entire cable path.

Reinforcement stamping 12 of electrode-connecting part 20 prevents bending during installation of the feed-through into a housing part and thereby a short circuit.

For optimum connection of electrode connecting part 10 with head part 5, the electrode connecting part 10 may be provided with a surface coating, for example consisting of copper or aluminum. Other coating materials such as for example Ag, Ni, Au, Pd and Zn would also be possible. A silver or gold alloy would also be possible. The electrode itself can consist of essentially any desired material, for example a metal, such as a light metal, for example aluminum, an aluminum alloy, magnesium or magnesium alloy.

It is feasible for electrode connecting component 10 and the feed-through component 1 may be produced in a separate process. This allows for optimum process control in regard to material selection, as well as production method. A connection between electrode connecting component 10 and head part 5 of feed-through component 1 is established only subsequently, for example through a joining process such as laser welding, ultrasonic welding, bonding, friction welding, caulking, flanging, resistance welding or soldering.

As can be seen in FIG. 1, feed-through component 1 with electrode connecting component 10 distinguishes itself through a very flat configuration which occupies very little space inside a battery cell. This is shown in detail in FIGS. 7a to 7b. Insulating components in the interior space of the battery or respectively the battery cell interior space can be achieved with the inventive arrangement.

Figure 2:
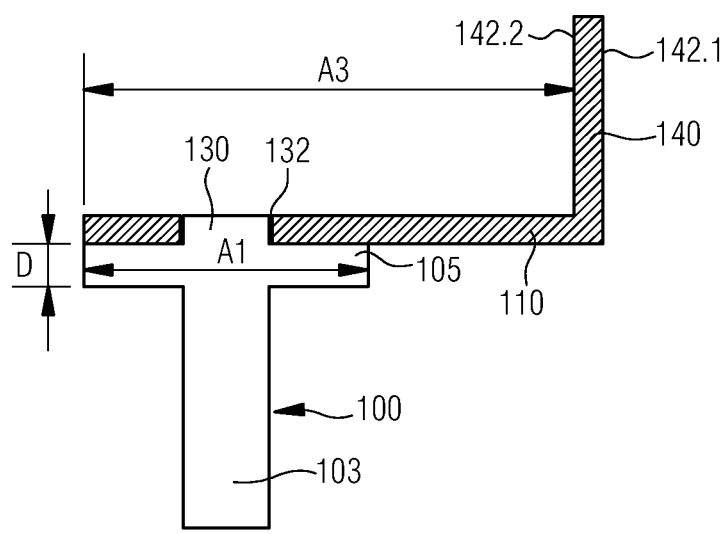
FIG. 2 is a feed-through component with an electrode connecting component, according to an embodiment of the present invention.

Referring now to FIG. 2, there is shown an embodiment of the present invention wherein electrode connecting part 110 features an individual configuration and for example in region 140, provides an individual anode or respectively cathode connection to the electrochemical cell of the battery. In the region of the individual anode or respectively cathode connection 140, surfaces 142.1, 142.2 can be optionally treated, for example by applying materials, in particular Cu or Al. Cu is generally used if region 140 is connected to the cathode of the electrochemical cell and Al is used if region 140 is connected to the anode. Aluminum or other well insulating materials can be used as the base material for the non-coated electrode connecting component 110. It can be seen clearly that in the arrangement according to FIG. 2, electrode connecting component 110 protrudes in its dimension A3 beyond dimension A1 of head part 105 of feed-through component 100. In the arrangement according to FIG. 2 identical components as in FIG. 1 are identified with reference numbers increased by 100. Feed-through component 100 includes an essentially pin-shaped conductor 103, as well as head part 105, whereby head part 105 again has a thickness D. In the arrangement according to FIG. 2 an essentially circular centering bore 132 is again provided in electrode connecting component 110, and the feed-through component 100 includes extension 130 which engages into the essentially circular centering bore 132 of electrode connecting part 110. Materials used for electrode connecting component 110 can, for example, be copper or aluminum. Other materials which offer good conductivity are also possible. Copper or aluminum can also be used for conductor 103, for example essentially pin-shaped conductor 103 as well as for head part 105 and extension 130. Other possible materials are CuSiC, AlSiC, NiFe and a copper core, that is a NiFe-jacket with a copper interior part, aluminum alloys, magnesium, magnesium alloys, copper alloys, silver, a silver alloy, gold, a gold alloy as well as a cobalt-iron alloy. Head part 105 and extension 130 are, for example, essentially circular components. In contrast, electrode connecting component 110 is, for example rectangular, whereby always individual anode/cathode connections are provided at the edges. Electrode connecting component 110 can be provided with reinforcement stamping. The shape of extension 130 may also be other than circular and would then represent a twist lock connection.

The feed-through component may not be sealed directly into a housing opening, but rather into a base body prior to being placed in the opening. The feed-through is then composed of the feed-through component, the glass or glass ceramic material and the base body.

Referring now to FIGS. 3a-5b, there is shown sealing of feed-through component 201, 301 into a base body 200, 300, resulting in a feed-through which can be placed into an opening in a housing component, for example a battery housing or respectively battery cell housing (see FIGS. 6a-7b). Sealing into a base body 200, 300 as shown in FIGS. 3a-5b has the advantage when compared to direct sealing into an opening, that a pre-assembly is possible. In other words, sealing of the feed-through component 201, 301 into the base body 200, 300 can occur before placing the feed-through into the opening in the housing part, in particular into the battery cell housing. The battery cell housing illustrated in FIGS. 6a-7b is a housing for a battery cell, for example a lithium-ion battery.

Base body 200 which accommodates the essentially pin-shaped conductor 203 of feed-through component 201 is, for example, substantially ring shaped. The material of base body 200 is for example a metal, such as a light metal, for example aluminum, AlSiC, but also steel, stainless steel, for example high grade steel. An aluminum alloy, magnesium, a magnesium alloy, a titanium alloy or titanium are also possible. In order to provide a hermetic feed-through of the conductor, in particular essentially pin-shaped conductor 203 through base body 200 and thereby the opening in the housing part, the conductor 203, in particular pin-shaped conductor 203 is sealed into a glass plug of glass or glass ceramic material, in other words, base body 200 and essentially pin-shaped conductor 203 are sealed with glass or glass ceramic material 280. The sealing temperature of the glass- or glass ceramic material may be 20K to 100K below the melting temperature of the material of base body 200 or the housing part into which the opening is worked (not illustrated) and or the pin-shaped conductor. If base body 200 is constructed of a metal having a low melting point, in particular a light metal, such as aluminum, an aluminum alloy, magnesium, a magnesium alloy, titanium, a titanium alloy or AlSiC, then a glass material through which the conductor is guided and which includes the following components in mole percent (mol.-%) may be used:

| | |
|---|---|
| $P_2O_5$ | 35-50 mol-%, for example 39-48 mol %; |
| $Al_2O_3$ | 0-14 mol-%, for example 2-12 mol %; |
| $B_2O_3$ | 2-10 mol-%, for example 4-8 mol %; |
| $Na_2O$ | 0-30 mol-%, for example 0-20 mol %; |
| $M_2O$ | 0-20 mol-%, for example 12-19 mol %, whereby M is, for example, K, Cs or Rb; |
| PbO | 0-10 mol-%, for example 0-9 mol %; |
| $Li_2O$ | 0-45 mol-%, for example 0-40 mol %, or 17-40 mol %; |
| BaO | 0-20 mol-%, for example 0-20 mol %, or 5-20 mol %; and |
| $Bi_2O_3$ | 0-10 mol-%, for example 1-5 mol %, or 2-5 mol %. |

In accordance with an additional embodiment of the present invention, the glass composition includes the following components in mol %:

| | |
|---|---|
| $P_2O_5$ | 38-50 mol-%, for example 39-48 mol %; |
| $Al_2O_3$ | 3-14 mol-%, for example 4-12 mol %; |
| $B_2O_3$ | 4-10 mol-%, for example 4-8 mol %; |
| $Na_2O$ | 10-30 mol-%, for example 14-20 mol %; |
| $K_2O$ | 10-20 mol-%, for example 12-19 mol %; and |
| PbO | 0-10 mol-%, for example 0-9 mol %. |

Below, eight examples (AB1-AB8) are shown in Table 1 for the aforementioned glass compositions:

TABLE 1

| Mol % | Examples: | | | | | | | |
|---|---|---|---|---|---|---|---|---|
| | AB1 | AB2 | AB3 | AB4 | AB5 | AB6 | AB7 | AB8 |
| $P_2O_5$ | 47.6 | 43.3 | 43.3 | 43.3 | 37.1 | 40.0 | 42.0 | 46.5 |
| $B_2O_3$ | 7.6 | 4.8 | 4.7 | 4.8 | 4.9 | 6.0 | 6.0 | 7.6 |
| $Al_2O_3$ | 4.2 | 8.6 | 8.7 | 2.0 | 2 | 12.0 | 12.0 | 4.2 |
| $Na_2O$ | 28.3 | 17.3 | | | | 15.0 | 16.0 | 28.3 |
| $K_2O$ | 12.4 | 17.3 | 17.3 | | | 18.0 | 19.0 | 12.4 |
| PbO | | | | | | 9.0 | | |
| BaO | | 8.7 | 8.7 | 15.4 | 14 | | | |
| $Li_2O$ | | | 17.3 | 34.6 | 42.1 | | | |
| $Bi_2O_3$ | | | | | | | 5 | 1 |
| Hemispherical Temperature (° C.) | 513 | 554 | 564 | 540 | 625 | | 553 | 502 |
| α (20-300° C.) ($10^{-6}$/K) | 19 | 16.5 | 14.9 | 13.7 | 14.8 | 16.7 | 16.0 | 19.8 |
| Tg (° C.) | 325 | 375 | 354 | 369 | 359 | 392 | 425 | 347 |
| Density grams per cubic centimeter [g/cm$^3$] | 2.56 | | | | | 3 | 3.02 | 2.63 |
| Leaching In Mass % | 18.7 | 14.11 | 7.66 | 12.63 | 1.47 | 3.7 | 29.01 | 8.43 |
| Weight Loss (%) after 70 hours in 70° C. water | 10.7 | 0.37 | 0.1 | 0.13 | 0.13 | n.b. | 0.006/0.001 | 0.45/0.66 |

The aforementioned special glass composition distinguishes itself in that the glass materials have very high thermal expansions α (20° C. and 300° C.) in the range of >15×10$^{-6}$/K, for example in the range 15×10$^{-6}$/K to 25×10$^{-6}$/K, and therefore in the range of the thermal expansion of light metals such as aluminum, but also of similar metals for the essentially pin-shaped conductors 203 which are guided through the glass material, namely for example copper. At room temperature, aluminum has a thermal expansion of α=23×10$^{-6}$/K, copper of 16.5×10$^{-6}$/K. In order to avoid that during the sealing process the light metal of the base body and possibly also the metal pin melts or deforms, the melting temperature of the glass material is below the melting temperature of the material of the base body and/or the conductor. The sealing temperature of the listed glass composition is then in the range of 250° C. to 650° C. Sealing of the essentially pin-shaped conductor 203 into base body 200 prior to placing the feed-through into the opening (not illustrated) is achieved in that the glass together with the conductor, for example the pin-shaped conductor is heated to the sealing temperature of the glass, so that the glass material softens and surrounds the pin-shaped conductor 203 and fits against base body 200. If, for example as described above, aluminum is used as a light material having a melting point $T_{melt}$=660.32° C. then the sealing temperature of the glass material is, for example, as described above in the range of 350° C. to 640° C. The material of pin-shaped conductor 203 may be identical to the material of the base body 200 which has the advantage that the coefficient of expansion for the base body and for the metal pin is identical. Coefficient of expansion $\alpha$ of the glass or glass ceramic material in the temperature range of 20° C. to 300° C. may either be adapted to the material in which case there is no compression seal feed-through, or it may have another coefficient of expansion $\alpha$ than the base body or respectively the pin-shaped conductor in which case there is a compression seal feed-through. An advantage of the compression seal feed-through is higher separating forces for the feed-through component. Alternatively, the pin shaped conductor may include copper, CuSiC- or NiFe-alloys.

Sealing temperature of the glass or glass ceramic material is to be understood to be the temperature of the glass or the glass ceramic material at which the glass or ceramic material softens and then fits closely against the metal with which is to be sealed so that a bonded joint connection is obtained between the glass or the glass ceramic and the metal.

The sealing temperature may for example be determined through the hemispherical temperature as described in R. Görke, K. J. Leers: Keram. Z. 48 (1996) 300-305, or according to DIN 51730, ISO 540 or CEN/TS 15404 and 15370-1 whose disclosure content is incorporated in its entirety into the current patent application. The measurement of the hemispherical temperature is described in detail in DE 10 2009 011 182 A1 whose disclosure content is incorporated in its entirety into the current patent application.

The glass compositions which may be used as solder glass—having become known from DE 10 2009 011 182 A1, pertain to high temperature applications, for example fuel cells.

The previously cited phosphate glass compositions have a lithium share of up to 45 mol-%, for example 35 mol-%. Surprisingly, these glass compositions are crystallization-stable, meaning they do not display detrimental crystallization or substantial crystallization.

The previously mentioned glass compositions contain lithium which is integrated in the glass structure. The glass compositions are hereby especially suited for lithium-ion storage devices which include electrolytes based on lithium, for example a 1 M $LiPF_6$ solution, including a 1:1 mixture of ethylene-carbonate and dimethyl-carbonate.

Low sodium or respectively sodium-free glass compositions are also feasible, since the diffusion of the alkali-ions occurs in Na+>K+>Cs+ sequence and since therefore low sodium with up to 20 mol % $Na_2O$ or respectively sodium-free glasses are especially resistant to electrolytes, especially those which are used in lithium-ion storage devices. Except for contaminants lead free glasses, meaning that they include less than 100 parts per million (ppm), for example less than 10 ppm, or less than 1 ppm of lead are feasible for use in accordance with the present invention.

The previously cited special glass compositions have a thermal expansion $\alpha$ in the range of 20° C. to 300° C.>14× $10^{-6}$/K, for example between $15\times10^{-6}$/K and $25\times10^{-6}$/K. An additional advantage of the glass composition is that sealing of the glass with the surrounding light metal or respectively the metal of the conductor, in particular in the embodiment of a metal pin, is possible also in a gaseous atmosphere which is not an inert gas atmosphere. In contrast to the previously used method, a vacuum is also no longer necessary for aluminum-sealing. This type of sealing can rather occur under atmospheric conditions. For both types of sealing nitrogen ($N_2$) or argon (Ar) can be used as inert gas. As a pre-treatment for sealing, the metal is cleaned and/or etched, and if necessary is subjected to targeted oxidizing or coating. During the process temperatures of between 300 and 600° C. are used at heating rates of 0.1 to 30 degrees Kelvin per minute (K/min) and dwell times of 1 to 60 minutes.

The housing part into which the feed-through or respectively feed-through component illustrated in the previously mentioned drawings is inserted is also, for example, produced from aluminum. The housing part has an outside and an inside. The outside is characterized in that it extends outward from the battery cell; the inside in that it extends—for example in the case of a lithium-ion accumulator—toward the electrolyte of the battery cell. This is illustrated in FIGS. 6a to 7b.

In the case of lithium-ion batteries, typically a non-aqueous electrolyte, typically consisting of a carbonate, such as a carbonate mixture, for example a mixture of ethylene-carbonate and dimethyl-carbonate is used, whereby aggressive non-aqueous battery electrodes include a conducting salt, for example conducting salt $LiPF_6$ in the form of a 1 M solution.

Figure 7A:
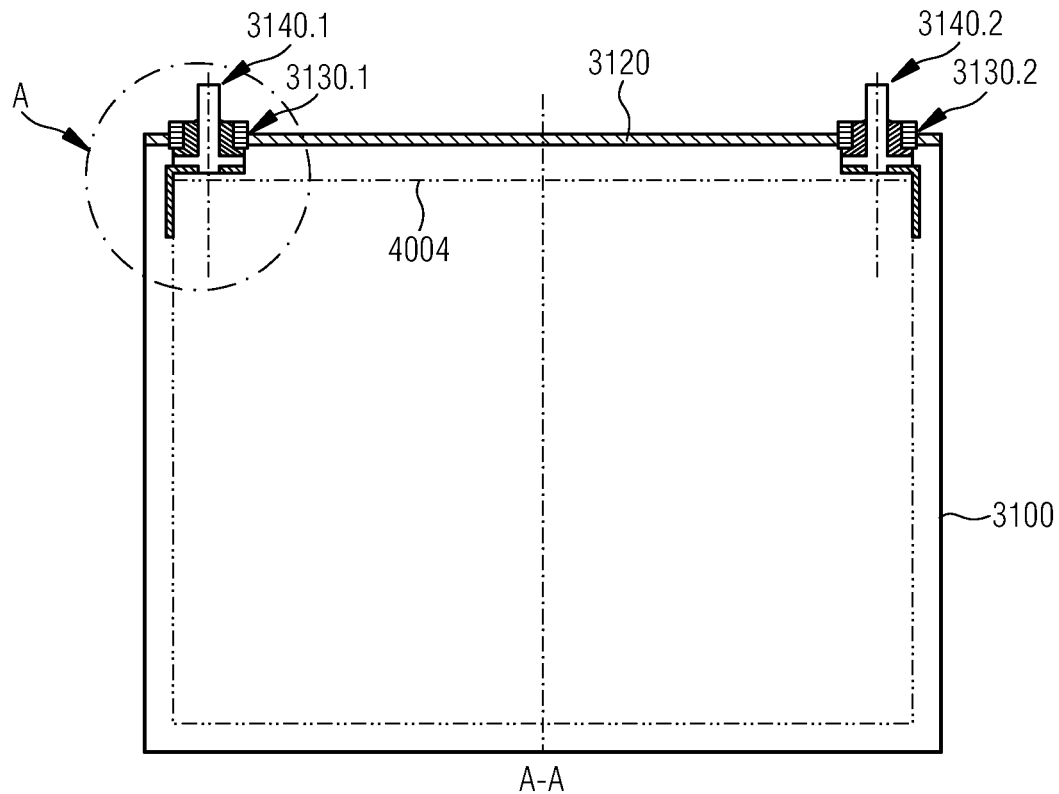
FIGS. 7a-7b illustrate a battery cell with a battery cell housing and a feed-through with a feed-through component with a head part according to the present invention and with an electrode connecting component.
Figure 7B:
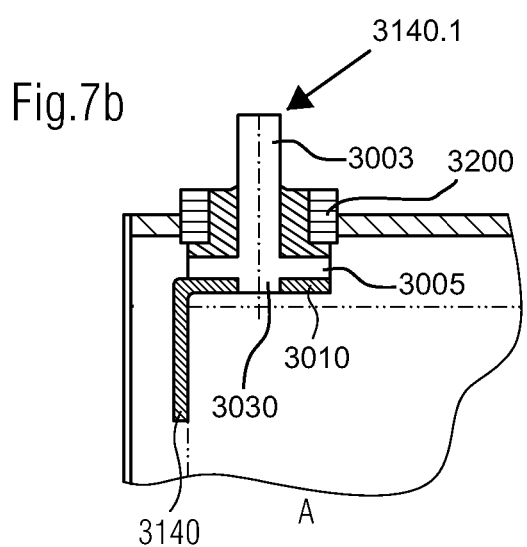

Feed-through components 201, 301 illustrated in FIGS. 3a-5b have an essentially pin-shaped conductor 203, 303 as well as a head part 205, 305 according to FIGS. 1a-2b, whereby the dimensions A1 of head part 205, 305 are greater than dimensions A2 of essentially pin-shaped conductor 203, 303. Head part 205, 305 is configured so that it can be connected with an electrode connecting part as illustrated in FIGS. 1a to 2b; it is particularly provided with an extension 230 which can serve as a centering part for the electrode connecting part. After installation into the opening of the housing part, the electrode connecting part (illustrated in FIGS. 1a-2b) which can be attached to head part 205 is oriented toward the inside that is toward the electrolyte of the battery cell. This is shown in FIGS. 7a-7b. In the arrangement according to FIGS. 3a-5b, the sealing can occur not only between pin-shaped conductor 203—which, through the ring-shaped base body 200 can in turn be inserted into a housing part—and base body 200, but the glass material or respectively glass ceramic material 280 can also be introduced between base body 200 and head part 205. This is advantageous for stabilization of the electrode connecting components.

An extension 230 protrudes beyond head part 205, for example into the interior of the battery cell (as illustrated in FIGS. 7a-7b), whereby extension 230 can serve to center the electrode connecting part (illustrated in FIGS. 1a-2b). Extension 230 of the conductor is always round, regardless of the shape of the essentially pin-shaped conductor 203, which may for example be oval or round.

Figure 3B:
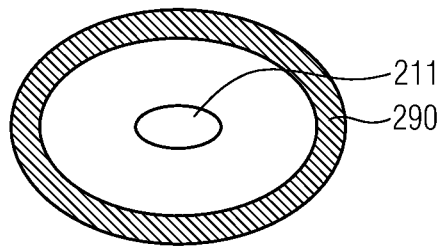
FIGS. 3a-3c illustrate a feed-through component without an electrode connecting component in an embodiment of the present invention with a base body.
Figure 3A:
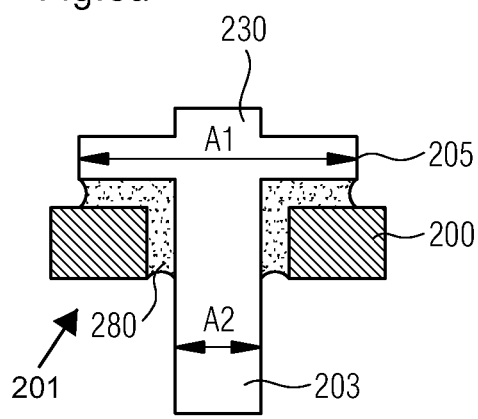
Figure 3C:
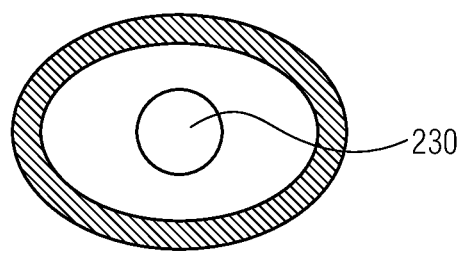

Ring-shaped base body 200 may assume different shapes—for example as shown in FIGS. 3a-3c an oval outside shape 290, whereby then also the conductor can be oval in the region in which it is guided through the oval base body, that is in region 211. However, the top view of extension 230 as illustrated in FIG. 3c shows it to be round for connection of the electrode connecting part.

Alternatively to an oval configuration of the ring-shaped base body—which is advantageous especially with narrow battery covers—it is possible to configure the pin-shaped conductor as well as the extension and the base body to be ring-shaped.

Figure 4B:
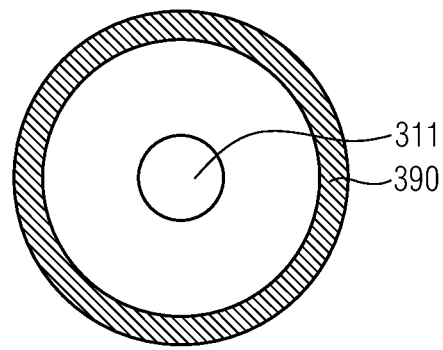
FIGS. 4a-4b illustrate a feed-through component without an electrode connecting component with a base body in an additional embodiment of the present invention.
Figure 4A:
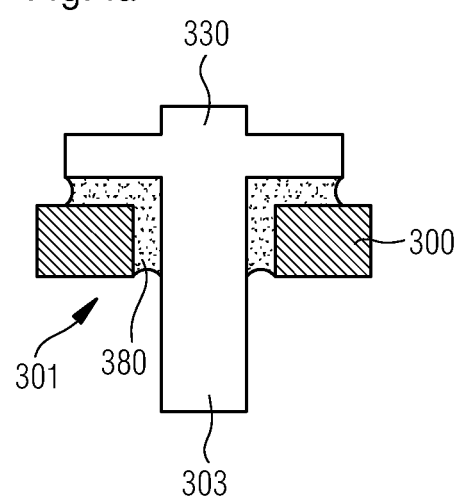

A ring-shaped base body with ring-shaped pin-shaped conductor is shown in FIGS. 4a-4b. Same components as shown in FIGS. 3a-3c are identified with reference numbers increased by 100. In FIGS. 4a-4b the pin-shaped conductor is identified for example with reference number 303, the head part with 305 and the ring-shaped base body with 300. The ring-shaped outside shape is identified with 390 and the region in which the conductor is guided through the base body with 311.

Figure 5A:
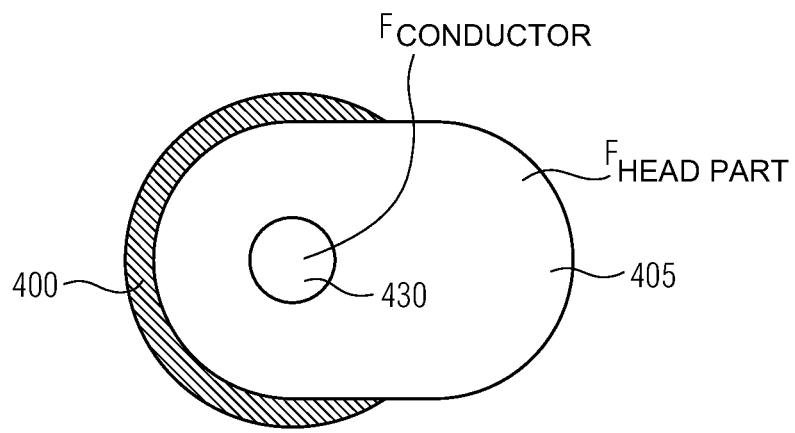
FIGS. 5a-5b illustrate a feed-through component without a connecting component with a base body in a further embodiment of the present invention.
Figure 5B:
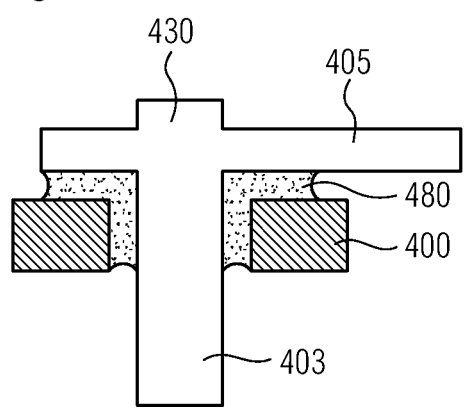

In order to connect other connection parts or connection components to the electrodes, it is provided in an arrangement according to FIGS. 5a-5b to project the head surface $F_{HEAD\ PART}$ of head part 405 over the diameter of the opening. In addition to the previously described joining methods, the flanging of head part 405 allows joining of the connecting components by through-welding, resistance welding or riveting due to accessibility from both sides. In FIG. 5a the inventive characteristic of the feed-through component, especially that the surface of head part 405 ($F_{HEAD\ PART}$) is larger than the surface of pin-shaped conductor 403 ($F_{CONDUCTOR}$) can be clearly seen. Since in the arrangement according to FIG. 5a the dimensions and shape of extension 430 of pin-shaped conductor 403 correspond, the cross sectional surface of extension 430 illustrated in the top view is consistent with the surface of the pin-shaped conductor. Same components as shown in FIGS. 3a-3c are identified with reference numbers increased by 200, in other words the pin-shaped conductor is identified with reference number 403, and the ring-shaped base body with 400. On the projection of the head part 405, electrode connecting parts may, for example, be attached by resistance welding or riveting as shown in FIGS. 2a-2b, for example based on the accessibility from both sides of the projection as described above.

In contrast to the arrangements illustrated in FIGS. 3a-5b of base body 200, 300, 400 as a basic ring, it can however also be in the form of a conical ring (not illustrated) which is inserted into a conically progressing opening in the housing part. The connection between the feed-through occurs again between the side walls of the conical opening and the conical base body, for example through welding, soldering, flanging or shrinking. It is however also possible to press the essentially conically progressing ring-shaped base body into the conical opening in the housing part or respectively the housing component. Due to the conical form of the opening as well as of the base body, a relative movement of the feed-through in the direction of outside of the housing part is avoided, since the conical bore and the conically shaped base body act as a barb and a relative movement in the direction of the outside leads to a positive locking fit between the base body of the feed-through and the sidewalls of the opening.

One advantage of the arrangement having a conical base body is that even under increased loads on the feed-through, for example pressure load, expulsion of the feed-through with the metal pin out of the feed-through opening is securely avoided. The openings may be introduced into the housing part through a simple manufacturing method, for example punching.

Figure 6A:
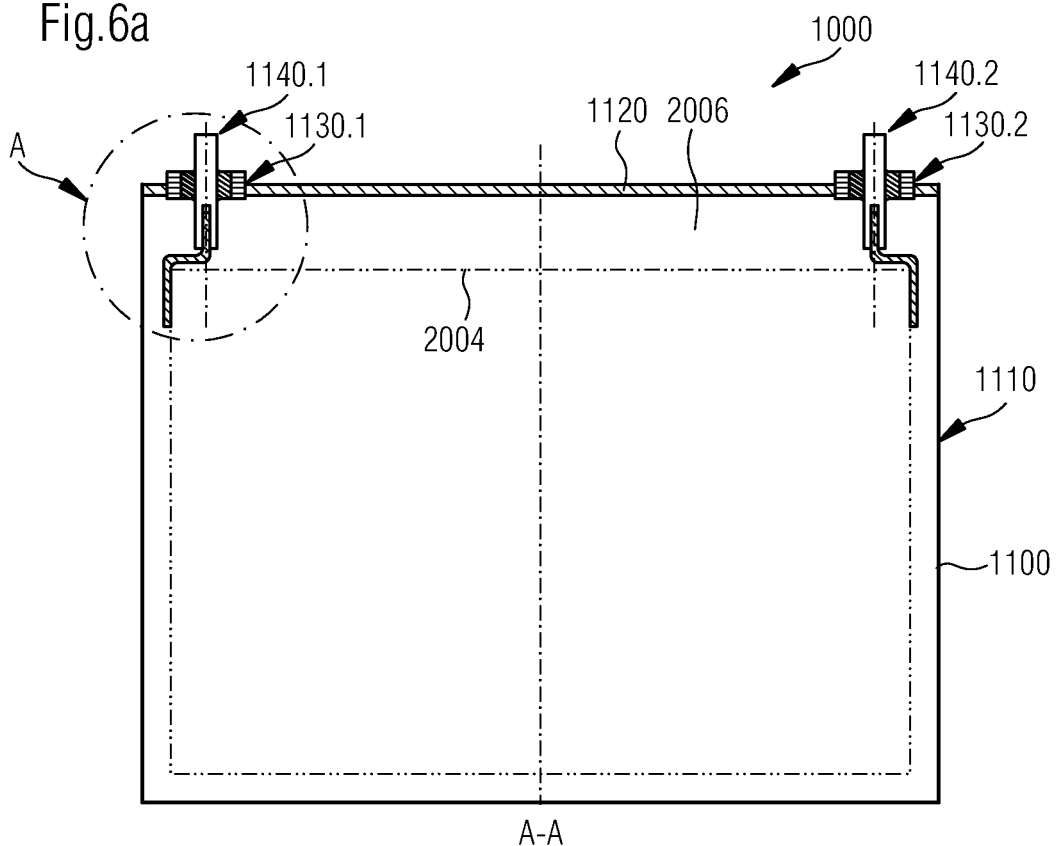
FIGS. 6a-6b illustrate a battery cell with a battery cell housing and a feed-through with a feed-through component without a head part and with an electrode connecting component according to the present invention.

Referring now to FIGS. 6a-7b, there are shown complete battery cells with inserted feed-throughs according to the present invention. FIGS. 6a-6b illustrate one arrangement of the present invention wherein the feed-through component is not equipped with a head part. In contrast thereto, FIGS. 7a-7b show a battery or respectively a battery cell with a housing and feed-throughs located therein, whereby the feed-through component is equipped with a head part according to the present invention. More specifically, FIG. 6a illustrates the principle configuration of a battery cell 1000. Battery cell 1000 includes housing 1100 with side walls 1110 and a cover part 1120. Openings 1130.1, 1130.2 are produced in cover part 1120 of housing 1100, for example by stamping. Feed-throughs 1140.1, 1140.2 are inserted in both openings 1130.1, 1130.2.

Figure 6B:
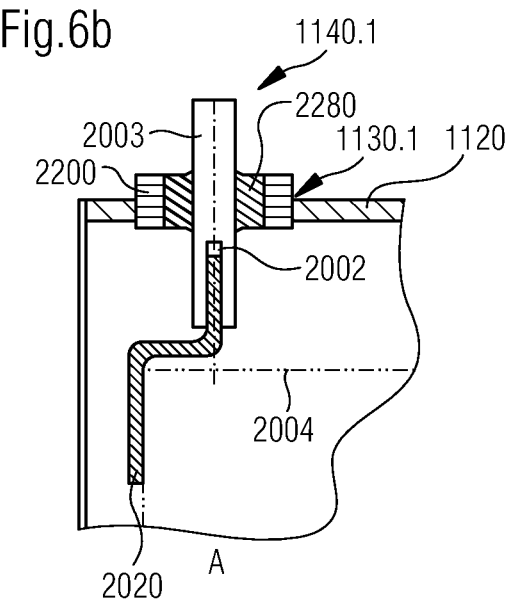

FIG. 6b shows a detailed section of battery cover 1120 with opening 1130.1 and the therein inserted feed-through 1140.1. Feed-through 1140.1 includes a pin-shaped conductor 2003, as well as a base body 2200. Pin-shaped conductor 2003 without a head part is sealed with a glass or glass ceramic material 2280 into base body 2200. After having been sealed into base body 2200 with glass or glass ceramic material 2280, pin-shaped conductor 2003 is inserted into opening 1130.1 as a complete component, for example in that base body 2200 of the feed-through, which consists, for example of aluminum, is joined for example through welding with strain-hardened cover part 1120 consisting of aluminum. Because of the sealing, only base body 2200 is, for example, softened.

A recess 2002 in which an electrode connecting part 2020 is inserted is provided on the pin-shaped conductor 2003. The electrode connecting component serves again either as cathode or as anode of electrochemical cell 2004 of battery cell 1000. The electrochemical cell of the lithium-ion battery is also referred to as battery cell 2004. Housing 1100 which surrounds battery cell 1000 is referred to as battery cell housing 1100.

As can be seen in FIG. 6a, based on the structure of feed-through 1140.1, 1140.2 with a pin-shaped conductor and an electrode connecting component which is inserted in recess 2002 of the pin-shaped conductor and which is to be connected with battery cell 2004, a large space 2006 which is created between battery cell 2004 and cover 1120 is associated herewith.

Due to the inventive flat structure of feed-through component as shown in FIGS. 7a and 7b, it is possible to minimize the unused space in the battery cell housing. Identical components as in FIGS. 6a and 6b are identified with reference numbers increased by 2000 in FIGS. 7a-7b. Feed-throughs 3140.1, 3140.2 are again inserted in openings 3130.1, 3130.2 of cover 3120 of battery cell housing 3100. In contrast to the feed-through component of the feed-throughs according to FIGS. 6a and 6b, the feed-through component is now provided with a pin-shaped conductor 3003 as well as with a head part 3005. The head part 3005 is equipped with an extension 3030, as well as with an electrode connecting component 3010 which is firmly attached to head part 3005 by welding, soldering or other previously described method. The electrode connecting component has a segment 3140, whereby segment 3140 serves as cathode or respectively anode for electrochemical cell, in this case the battery cell. As can be seen from FIGS. 7a-7b the advantage of the inventive feed-through component is clearly recognizable. The configuration of the feed-through illustrated in FIGS. 7a-7b determines that as little space as possible inside the battery cell housing remains unused.

The arrangement of the feed-through according to FIGS. 7a and 7b is substantially consistent with the arrangement of the feed-throughs shown in FIG. 2 and FIGS. 5a-5b. The description for FIG. 2 is hereby incorporated in its entirety into the current description of the battery cell.

In an alternative arrangement of a feed-through, as is illustrated in FIGS. 8a-8d, a pin-shaped conductor 10003 with head part 10005 is sealed into an opening 10130 of a housing 10110, in particular a battery cell housing in such a manner that head part 10005 of pin-shaped conductor 10003 is connected with outside 15000 of the battery housing 10110. Outside 15000 of battery housing 10110 in the current example is to be understood to be the side of the battery housing which is not facing toward the inside of the battery cell, but instead to the outside. The positioning of head part 10005 on outside 15000 serves to increase rigidity, in particular on thin-walled battery housings. The essentially pin-shaped conductor is sealed into a glass or respectively glass ceramic material 10080. In the illustrated embodiment, the glass or respectively glass ceramic material 10080 is not only introduced between the essentially pin-shaped conductor 10003 and inside wall 10210 of opening 10130, but also between head part 10005 and outside 15000 of the battery housing. In an additional process step after sealing, an attachment 20000 is connected on inside 15050 of the battery housing with essentially pin-shaped conductor 10003 on its inside 20100. Between attachment 20000 and inside 15050 of battery housing 10110 a support disk 20200 can be provided for stabilization. Attachment 20000 can be welded or soldered together on inside 20100 with the essentially pin-shaped conductor 10003 protruding into the inside. Attachment 20000 serves as the connection with the electrodes (not illustrated) of the battery cell, however it can also serve as contact between the battery cells. In this respect attachment 20000 is an electrode connecting component in accordance with the present invention. In the arrangement according to FIG. 8a the thickness of the battery housing in the region of the opening or respectively feed-through opening 10130 was increased in a reshaping process, thereby increasing the length of the seal.

An additional option to reinforce battery housing 10110 is to provide an outer ring 20300 which will be connected with outside 15000 of battery housing 10110, for example through welding. A longer seal length may also be provided herewith. After installation of outer ring 20300 as illustrated in FIGS. 8b and 8c to outside 15000 of the battery housing or respectively the battery cover, essentially pin-shaped conductor 10003 is sealed. In contrast to the procedure according to FIG. 8a, such a procedure offers the advantage that during sealing or sealing of the essentially pin shaped conductor into the battery housing leakages are avoided. Same components in FIGS. 8b-8c as in FIG. 8a are identified with the same reference numbers. In the arrangement with outer ring 20300 according to FIG. 8b, a simple pin-shaped conductor without head part is used. FIG. 8c, as does FIG. 8a, shows one embodiment with head part 10005. Head part 10005 of pin 10003 facilitates increasing strength and rigidity. As in FIG. 8a, the feed-through according to FIG. 8c illustrates attachment 20000, as well as a support part 20200. Sealing 10080, for example will glass or a glass ceramic according to the present invention occurs in opening 10130 of the battery housing and between head part 10005 and outer ring 20300. The advantage compared to the arrangement in FIG. 8a is that when welding the pin-shaped conductor into the battery housing, leakages are avoided. An additional advantage is that outer ring 20300 can consist of a different material than the battery housing. Fabrication is simplified, since the battery housing does not need to be reshaped in the region of the opening. A disadvantage of reshaping is that material is required in the region which is to be reshaped or, in the region of the through-opening the structure is weakened locally in the region of inside wall 10210 and the transfer, which can lead to cracking. In contrast, outer ring 20300 is mounted separately with the result that the hole that is to be formed is easier to produce. The structure in the feed-through is more stable, due to avoidance of the reshaped material. Moreover, as described above the outer ring can be fabricated from a different material. A more effective seal attachment can hereby be ensured. The outer ring can moreover have a higher specific heat capacity than the surrounding housing, so that temperature spikes during operation can be better intercepted and the glass feed-through be relieved.

Figure 8D:
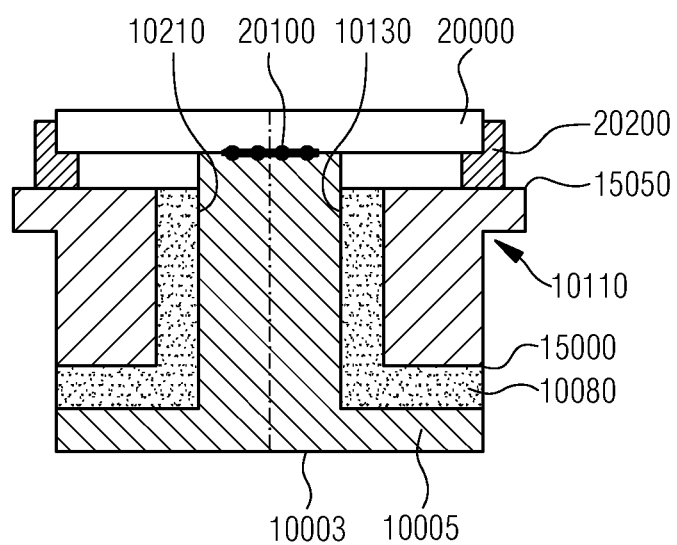

FIG. 8d shows a modified embodiment of the feed-through of FIG. 8a. As in FIG. 8a, FIG. 8d shows the housing in the region of feed-through opening 10130 as a single part component and the length of the sealing extended through reshaping. Same components as in FIG. 8a are identified with the same reference numbers. However, in contrast to FIG. 8a no pin-shaped conductor protruding beyond head part 10005 is provided. Also, the pin-shaped conductor protruding over attachment 20000 is missing.

A very high stability, in particular against mechanical stresses such as vibration is achieved with the arrangement of the pin-shaped conductors with a head part and the therewith connected electrode connecting components.

The current invention cites for the first time a feed-through for a housing, in particular a battery cell housing, for example for a lithium-ion battery which can be pre-manufactured and which is especially suited to be utilized in housing components of battery cell housings consisting essentially of a light metal, in particular aluminum (Al) or an aluminum alloy. However, metals such as steel or high-grade steel, in particular stainless steel are also possible as materials for the battery cell housing. In such a case the materials of the pin-shaped conductor with head part and if applicable of the base body are selected and adapted accordingly.

The inventive solution further allows reverting to a cost-effective manufacturing process and basic materials. Moreover, the entire feed-through can be in the embodiment of a pre-manufactured component into which the metal pin is sealed into a base body by a bonding material that is for example a glass plug, before the base body is placed into the housing component. This ensures that there is no loss of strain-hardening of the housing component. Moreover, material thicknesses and materials for the housing component and the base body can be selected independently. The feed-through can be mechanically as well as thermally relieved through a special arrangement with a relief device.

With the feed-through component according to the present invention, a battery housing can be provided which is hermetically sealed even in the event of a deformation of the battery housing, as opposed to plastic feed-throughs which have a tendency to crack formation. With batteries having battery housings which are equipped with an inventive feed-through an especially high fire resistance is hereby provided in the event of an accident. This is particularly relevant in the use of batteries, such as lithium-ion batteries in the automobile industry.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A feed-through for passing through an opening in a part of a housing, the feed-through comprising:
   one of a glass material and a glass ceramic material;
   at least one conductor embedded in said one of a glass material and a glass ceramic material, said at least one conductor defining a longitudinal axis and including a main body embedded in said one of a glass material and a glass ceramic material and a head part connected to said main body, said main body having a body width which extends in a direction perpendicular to said longitudinal axis and said head part having a head width which extends in a direction perpendicular to said longitudinal axis and is greater than said body width, said head part being configured to be joined with an electrode connecting component to form a mechanically stable and non-detachable electrical connection having good conductivity; and
   a base body for inserting into said opening in said part of said housing, said base body being formed from a metal and having a base body opening through which said at least one conductor embedded in said one of a glass material and a glass ceramic material is guided, wherein said base body opening is sealed by said one of a glass material and a glass ceramic material.

2. The feed-through according to claim 1, wherein the part of a housing is for a battery housing.

3. The feed-through according to claim 1, wherein said at least one conductor is an essentially pin-shaped conductor.

4. The feed-through according to claim 1, wherein said electrode connecting component consists essentially of one of copper, a copper ally, CuSiC, an aluminum alloy, AlSiC and aluminum.

5. The feed-through according to claim 3, said head part further comprising a centering part.

6. The feed-through according to claim 5, said centering part being an extension protruding over said head part of said essentially pin-shaped conductor.

7. The feed-through according to claim 6, wherein said extension is round.

8. The feed-through component according to claim 6, wherein said extension is not round and is a twist lock.

9. The feed-through according to claim 7, said electrode connecting component having a centering opening configured to accommodate said extension of said head part.

10. The feed-through according to claim 1, said electrode connecting component being connected with said head part by one of welding, soldering, grouting, caulking, flanging, shrinking and clamping.

11. The feed-through according to claim 1, said electrode connecting component further comprising a coating.

12. The feed-through according to claim 11, said coating being at least one of copper (Cu), aluminum (Al), nickel (Ni), gold (Au), palladium (Pd), zinc (Zn) and silver (Ag).

13. The feed-through according to claim 12, said head part further comprising a projection.

14. The feed-through according to claim 13, said essentially pin-shaped conductor including one of an aluminum alloy, aluminum, a copper alloy, copper, a silver alloy, silver, a gold alloy, gold, magnesium and a magnesium alloy.

15. The feed-through according to claim 1, wherein said one of a glass material and a glass ceramic material includes:

| | |
|---|---|
| $P_2O_5$ | 35-50 mole percent (mol-%); |
| $Al_2O_3$ | 0-14 mol-%; |
| $B_2O_3$ | 2-10 mol-%; |
| $Na_2O$ | 0-30 mol-%; |
| $M_2O$ | 0-20 mol-%, wherein M is one of potassium (K), cesium (Cs) and rubidium (Rb); |
| PbO | 0-10 mol-%; |
| $Li_2O$ | 0-45 mol-%; |
| BaO | 0-20 mol-%; and |
| $Bi_2O_3$ | 0-10 mol-%. |

16. The feed-through component according to claim 15, said one of a glass material and a glass ceramic material including:

| | |
|---|---|
| $P_2O_5$ | 39-48 mol-%; |
| $Al_2O_3$ | 2-12 mol-%; |
| $B_2O_3$ | 4-8 mol-%; |
| $Na_2O$ | 0-20 mol-%; |
| $M_2O$ | 12-19 mol-%; |
| PbO | 0-9 mol-%; |
| $Li_2O$ | 0-40 mol-%; |
| BaO | 5-20 mol-%; and |
| $Bi_2O_3$ | 1-5 mol-%. |

17. The feed-through component according to claim 16, said one of a glass material and a glass ceramic material including:

| | |
|---|---|
| $Li_2O$ | 17-40 mol-%; and |
| $Bi_2O_3$ | 2-5 mol-%. |

18. The feed-through according to claim 15, said one of a glass material and a glass ceramic material including:

| | |
|---|---|
| $P_2O_5$ | 38-50 mol-%; |
| $Al_2O_3$ | 3-14 mol-%; |
| $B_2O_3$ | 4-10 mol-%; |
| $Na_2O$ | 10-30 mol-%; |
| $K_2O$ | 10-20 mol-%; and |
| PbO | 0-10 mol-%. |

19. The feed-through according to claim 18, said one of a glass material and a glass ceramic material including:

| | |
|---|---|
| $P_2O_5$ | 39-48 mol-%; |
| $Al_2O_3$ | 4-12 mol-%; |
| $B_2O_3$ | 4-8 mol-%; |
| $Na_2O$ | 14-20 mol-%; |
| $K_2O$ | 12-19 mol-%; and |
| PbO | 0-9 mol-%. |

20. A method of producing a feed-through component for feeding through a part of a housing, the method comprising the steps of:
   providing a feed-through component including at least one essentially pin-shaped conductor and a head part;
   providing an electrode connecting component which is separate from said feed-through component; and connecting said feed-through component with said electrode connecting component in a region of said head part through a mechanically stable, non-detachable connection.

21. The method according to claim 20, wherein said housing is a battery housing.

22. The method according to claim 20, further comprising the step of treating a surface of said electrode connecting component.

23. The method according to claim 22, wherein said treating step includes coating said surface of said electrode connecting component prior to connecting said electrode connecting component with said feed-through component.

24. The method according to claim 23, wherein said electrode connecting component is coated with one of copper (Cu), aluminum (Al), silver (Ag), nickel (Ni), gold (Au), palladium (Pd) and zinc (Zn).

25. The method according to claim 20, wherein said step of connecting said feed-through component with said electrode connecting component in said region of said head part by one of welding, soldering, caulking, flanging, shrinking, pressing, clamping and crimping.

26. The method according to claim 25, wherein said welding includes one of laser welding, resistance welding, electron beam welding, ultrasonic welding and friction welding.

27. The method according to claim 20, further comprising the step of providing said electrode connecting component with a reinforcement stamping.

28. The method according to claim 27, further comprising the step of providing said electrode connecting component with a centering opening which is one of round and not round and which provides one of a centering possibility and a twist lock.

29. The method according to claim 20, further comprising the step of sealing said feed-through component in one of a glass material and a glass ceramic material into one of a base body and an opening of the part of the housing prior to said step of connecting said feed-through component with said electrode connecting component.

30. The method according to claim 29, said one of a glass material and a glass ceramic material including:

| | |
|---|---|
| $P_2O_5$ | 35-50 mole percent (mol-%); |
| $Al_2O_3$ | 0-14 mol-%; |
| $B_2O_3$ | 2-10 mol-%; |
| $Na_2O$ | 0-30 mol-%; |
| $M_2O$ | 0-20 mol-%, wherein M is one of potassium (K), cesium (Cs) and and rubidium (Rb); |
| PbO | 0-10 mol-%; |
| $Li_2O$ | 0-45 mol-%; |
| BaO | 0-20 mol-%; and |
| $Bi_2O_3$ | 0-10 mol-%. |

31. The method according to claim 27, said one of a glass material and a glass ceramic material including:

| | |
|---|---|
| $P_2O_5$ | 39-48 mole percent (mol-%); |
| $Al_2O_3$ | 2-12 mol-%; |
| $B_2O_3$ | 4-8 mol-%; |
| $Na_2O$ | 0-20 mol-%; |
| $M_2O$ | 12-19 mol-%; |
| PbO | 0-9 mol-%; |
| $Li_2O$ | 0-40 mol-%; |
| BaO | 5-20 mol-%; and |
| $Bi_2O_3$ | 1-5 mol-%. |

32. The method according to claim 31, said one of a glass material and a glass ceramic material including:

| | |
|---|---|
| $Li_2O$ | 17-40 mol-%; and |
| $Bi_2O_3$ | 2-5 mol-%. |

33. The method according to claim 30, said one of a glass material and a glass ceramic material including:

| | |
|---|---|
| $P_2O_5$ | 38-50 mol-%; |
| $Al_2O_3$ | 3-14 mol-%; |
| $B_2O_3$ | 4-10 mol-%; |
| $Na_2O$ | 10-30 mol-%; |
| $K_2O$ | 10-20 mol-%; and |
| PbO | 0-10 mol-%. |

34. The method according to claim 33, said one of a glass material and a glass ceramic material including:

| | |
|---|---|
| $P_2O_5$ | 39-48 mol-%; |
| $Al_2O_3$ | 4-12 mol-%; |
| $B_2O_3$ | 4-8 mol-%; |
| $Na_2O$ | 14-20 mol-%; |
| $K_2O$ | 12-19 mol-%; and |
| PbO | 0-9 mol-%. |

35. A housing, comprising:
an electrode connecting component; and
at least one feed-through component connected with said electrode connecting component, said at least one feed-through component including:
one of a glass material and a glass ceramic material; and
at least one conductor embedded in said one of a glass material and a glass ceramic material, said at least one conductor having a cross sectional surface and including a head part having a head part surface which is larger than said cross sectional surface of said at least one conductor, said head part being joined with said electrode connecting component to form a mechanically stable and non-detachable electrical connection having good conductivity.

36. The housing according to claim 35, wherein the housing is a battery housing.

37. The housing according to claim 35, wherein the housing includes a light metal.

38. The housing according to claim 37, wherein said light metal is one of aluminum, an aluminum alloy, magnesium, a magnesium alloy, titanium and a titanium alloy.

39. The housing according to claim 36, wherein the housing includes a metal.

40. The housing according to claim 39, wherein said metal is one of steel, high-grade steel, stainless steel, and tool steel.

41. The feed-through according to claim 1, wherein said base body has a ring-shape.

42. The feed-through according to claim 1, wherein said metal of said base body is a light metal.

43. The feed-through according to claim 42, wherein said light metal is one of aluminum, an aluminum alloy, AlSiC, magnesium, a magnesium alloy, titanium, and a titanium alloy.

44. The feed-through according to claim 1, wherein said metal of said base body is steel.

45. The feed-through according to claim 44, wherein said metal of said base body is one of stainless steel, high grade steel, and tool steel.

46. The feed-through according to claim 1, wherein a coefficient of thermal expansion in the temperature range of 20° C. to 300° C. of said one of a glass material and glass ceramic material is different from a coefficient of thermal expansion in the temperature range of 20° C. to 300° C. of a material of at least one of said base body and said at least one conductor in such a way that a compression seal feed-through is formed.

47. A device, comprising:
a housing having a housing opening; and
a feed-through placed in said housing opening, said feed-through including:
  a base body formed from a metal and inserted into said housing opening in said housing, said base body having a base body opening formed therein;
  one of a glass material and a glass ceramic material sealing said base body opening; and
  at least one conductor embedded in said one of a glass material and a glass ceramic material, said at least one conductor defining a longitudinal axis and including a main body embedded in said one of a glass material and a glass ceramic material and a head part connected to said main body, said main body having a body width which extends in a direction perpendicular to said longitudinal axis and said head part having a head width which extends in a direction perpendicular to said longitudinal axis and is greater than said body width, said head part being configured to be joined with an electrode connecting component to form a mechanically stable and non-detachable electrical connection having good conductivity.

* * * * *

UNITED STATES PATENT AND TRADEMARK OFFICE
CERTIFICATE OF CORRECTION

PATENT NO. : 10,751,831 B2
APPLICATION NO. : 13/968541
DATED : August 25, 2020
INVENTOR(S) : Kroll et al.

It is certified that error appears in the above-identified patent and that said Letters Patent is hereby corrected as shown below:

In the Specification

Column 9
At Line 26 and 27, please delete "expan-sion a", and substitute therefore --expan-sion α--.

Column 11
At Line 4, please delete "exapansion a", and substitute therefore --expansion α--.

Signed and Sealed this
Eleventh Day of October, 2022

*Katherine Kelly Vidal*

Katherine Kelly Vidal
*Director of the United States Patent and Trademark Office*